United States Patent
Khlat et al.

(10) Patent No.: US 8,200,181 B1
(45) Date of Patent: Jun. 12, 2012

(54) NOISE REDUCTION IN A DUAL RADIO FREQUENCY RECEIVER

(75) Inventors: Nadim Khlat, Midi-Pyrenees (FR); Alexander Wayne Hietala, Phoenix, AZ (US); Frank Della Corte, Santa Cruz, CA (US)

(73) Assignee: RF Micro Devices, Inc., Greensboro, NC (US)

( * ) Notice: Subject to any disclaimer, the term of this patent is extended or adjusted under 35 U.S.C. 154(b) by 788 days.

(21) Appl. No.: 12/201,116

(22) Filed: Aug. 29, 2008

(51) Int. Cl.
*H04B 1/26* (2006.01)
*H04B 15/00* (2006.01)
*H04B 1/28* (2006.01)

(52) U.S. Cl. ........ 455/313; 455/311; 455/318; 455/323; 455/326

(58) Field of Classification Search .................. 455/132, 455/133, 137, 139–141, 146–147, 179.1–180.3, 455/188.1–190.1, 207–209, 552.1–553.1, 455/311, 313–326, 333
See application file for complete search history.

(56) References Cited

U.S. PATENT DOCUMENTS

| | | | | |
|---|---|---|---|---|
| 3,987,400 A | * | 10/1976 | Fathauer | 455/168.1 |
| 6,754,508 B1 | * | 6/2004 | Pau | 455/552.1 |
| 6,804,261 B2 | * | 10/2004 | Snider | 370/478 |
| 7,020,444 B2 | * | 3/2006 | Shinbo et al. | 455/76 |
| 7,447,491 B2 | * | 11/2008 | Khoini-Poorfard | 455/258 |
| 7,742,785 B2 | * | 6/2010 | Harms | 455/552.1 |
| 7,751,791 B2 | * | 7/2010 | Dubash et al. | 455/302 |
| 7,869,782 B2 | * | 1/2011 | Plevridis et al. | 455/260 |
| 2004/0121753 A1 | * | 6/2004 | Sugar et al. | 455/333 |
| 2005/0118977 A1 | * | 6/2005 | Drogi et al. | 455/323 |
| 2005/0181752 A1 | * | 8/2005 | Sahota | 455/132 |
| 2006/0068746 A1 | * | 3/2006 | Feng et al. | 455/323 |
| 2007/0111661 A1 | * | 5/2007 | Bargroff et al. | 455/13.3 |
| 2007/0218851 A1 | * | 9/2007 | Soe et al. | 455/209 |
| 2008/0132192 A1 | * | 6/2008 | Lim | 455/315 |
| 2009/0117938 A1 | * | 5/2009 | Georgantas et al. | 455/552.1 |
| 2009/0170452 A1 | * | 7/2009 | Rubin et al. | 455/118 |

* cited by examiner

*Primary Examiner* — Simon Nguyen
(74) *Attorney, Agent, or Firm* — Withrow & Terranova, P.L.L.C.

(57) ABSTRACT

The present invention relates to a dual radio frequency (RF) receiver circuit that includes a first RF mixer and a second RF mixer. The first and second RF mixers may be fed from a common local oscillator or from two separate local oscillators. When fed from two separate local oscillators and when the first and second RF mixers are receiving the same or nearly the same RF channel, the frequency of the RF channel is less than the frequency of one local oscillator and is greater than the frequency of the other local oscillator. This arrangement separates the frequencies of the local oscillators, thereby reducing noise, instability, or both, which may otherwise de-sensitize the dual RF receiver circuit.

28 Claims, 14 Drawing Sheets

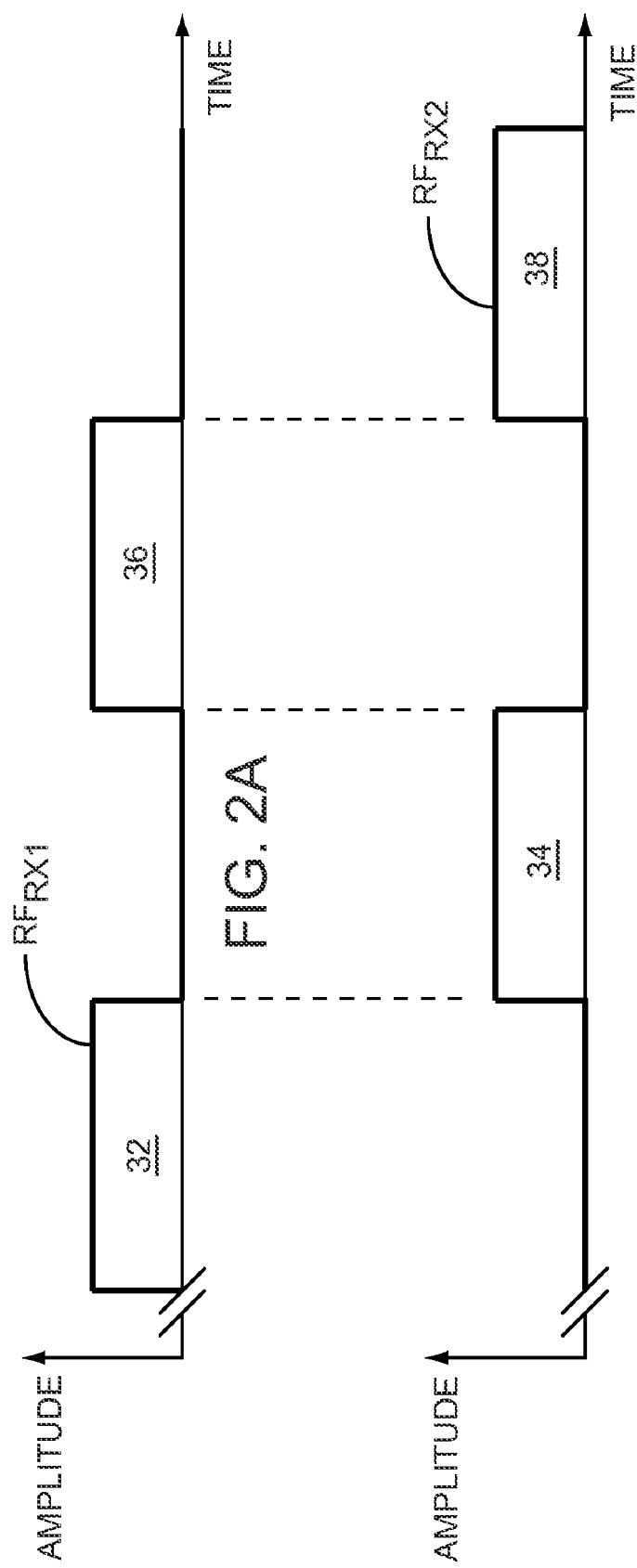

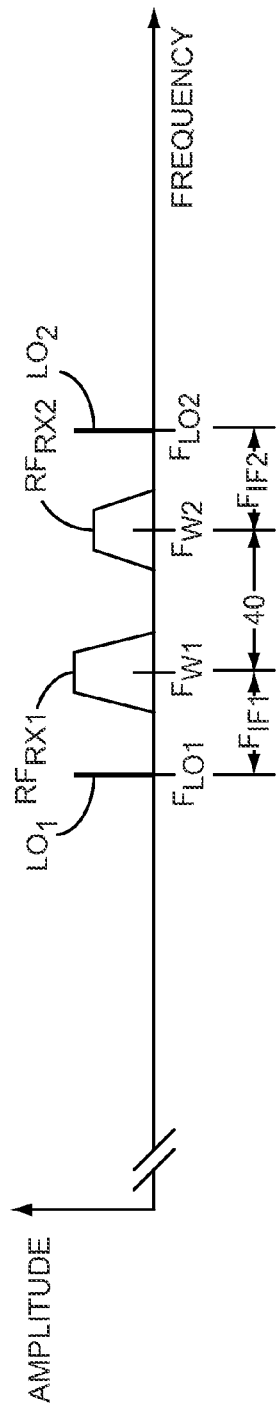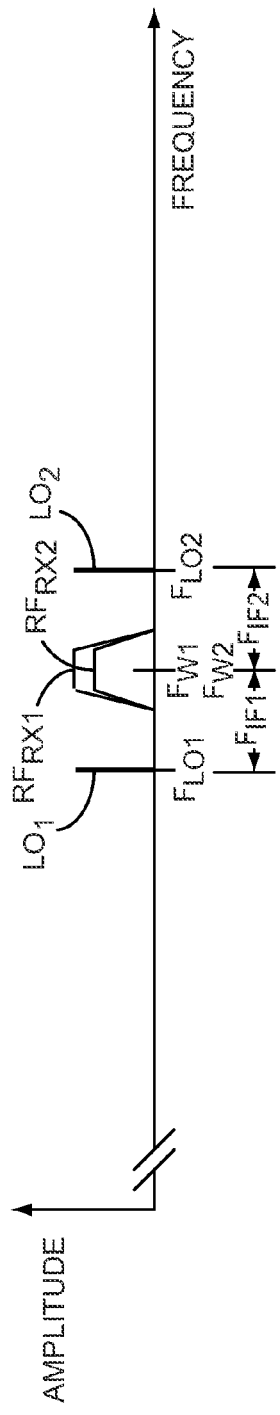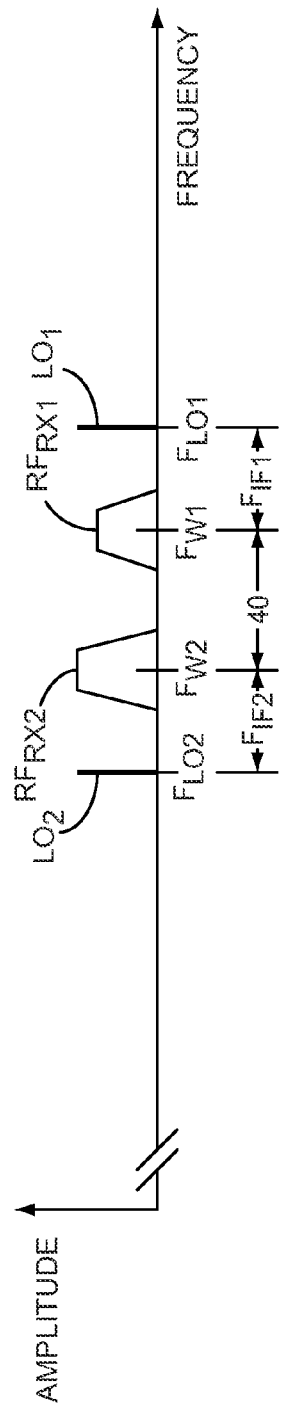

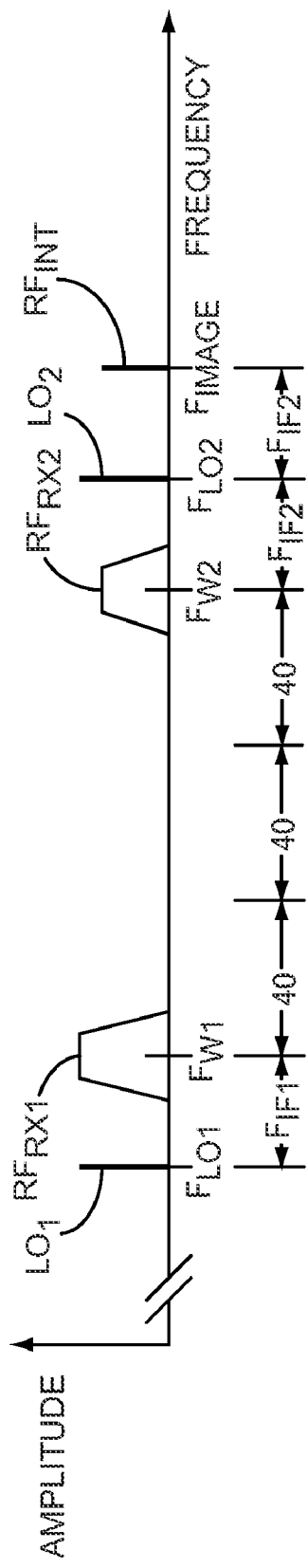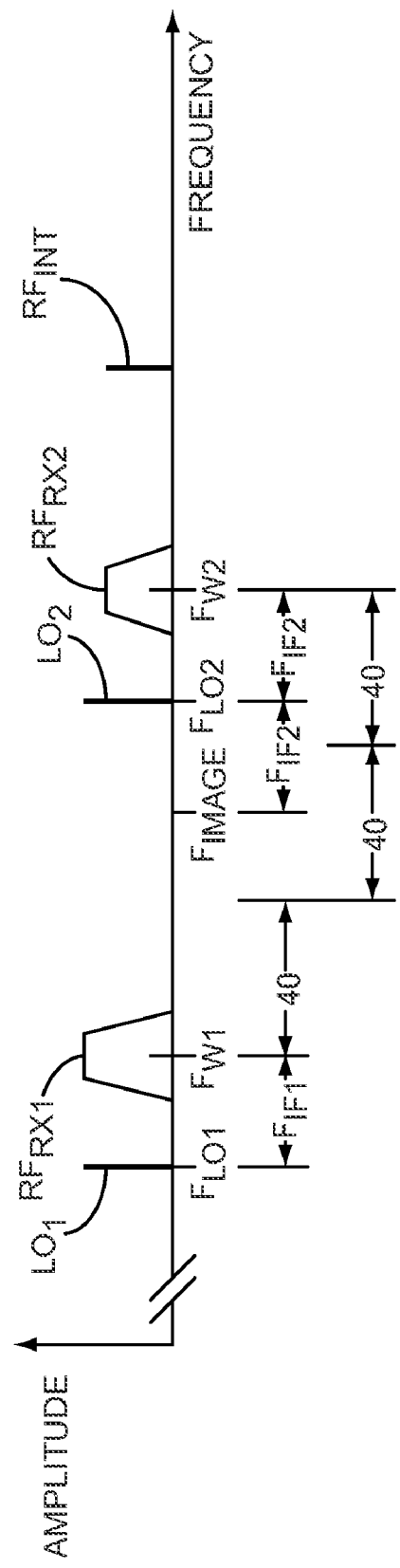
FIG. 4A
FIG. 4B

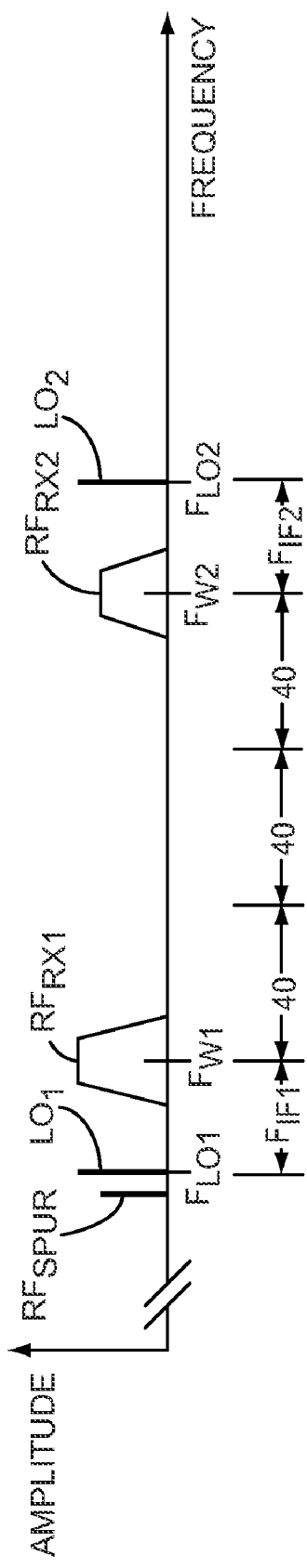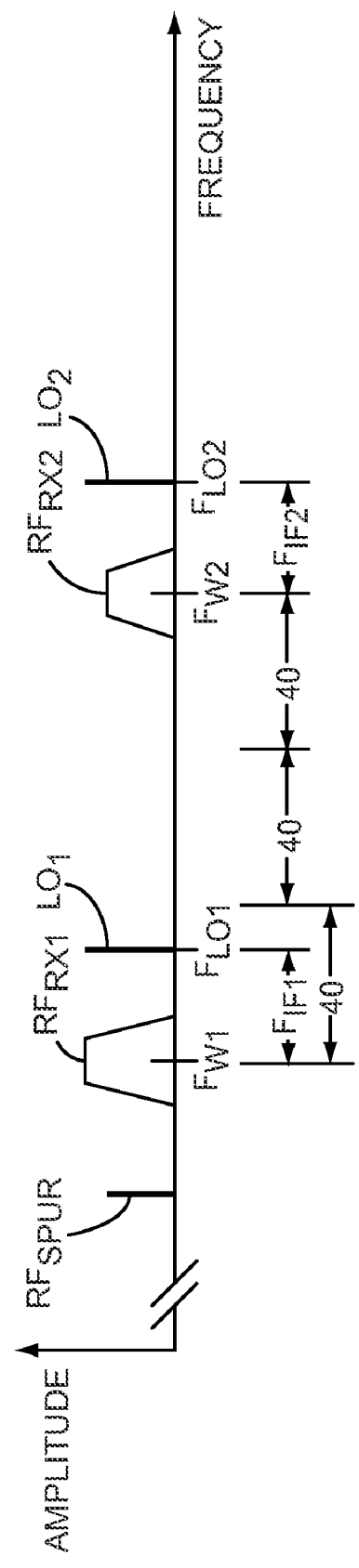

NOISE REDUCTION IN A DUAL RADIO FREQUENCY RECEIVER

FIELD OF THE INVENTION

Embodiments of the present invention relate to radio frequency (RF) mixers used in RF receiver circuitry, which may be used in wireless communications systems.

BACKGROUND OF THE INVENTION

As technology progresses, wireless communication protocols demand increasing rates of data transfer. Therefore, increasingly efficient methods of data encoding and processing are often required. Some wireless systems incorporate dual receiver architectures to simultaneously process data from two different data streams. Such approaches may double data rates when compared with existing architectures. For example, an Enhanced Data Rates for Global Evolution (EDGE) Evolution protocol is a multiple radio frequency (RF) channel protocol. Two data streams are transmitted to a dual receiver, such that each data stream has its own set of radio frequency (RF) channels. Transmission may alternate between the two data steams as each data stream switches its RF channel, such that only one data stream is transmitted at a time.

For example, a first data stream is transmitted on one of a first set of RF channels followed by a second data stream transmitted on one of a second set of RF channels. Then, the first data stream is transmitted on another of the first set of RF channels followed by the second data stream transmitted on another of the second set of RF channels, and so on. On the receive side, while the first data stream is being received by a first side of the dual receiver, a second side of the dual receiver is switching RF channels in preparation to receive the second data stream. Then, while the second data stream is being received by the second side of the dual receiver, a first side of the dual receiver is switching RF channels in preparation to receive the first data stream. Since data is being received by one side of the dual receiver while the other side of the dual receiver is switching RF channels, this approach allows continuous reception of data.

Each side of the dual receiver may have its own local oscillator for selecting the appropriate RF channel, and since each data stream has its own set of RF channels, it may be possible for one side of the dual receiver to be receiving on one RF channel while the other side of the dual receiver is switching to the same or an adjacent RF channel. Therefore, both local oscillators may be tuned to the same or nearly the same frequency. Since both local oscillators may be provided by the same semiconductor die or by a common module, circuit parasitics may introduce noise or instability into the local oscillators that would not be present when the local oscillators are tuned to different frequencies. The noise or instability may de-sensitize either of both sides of the dual receiver, thereby reducing the effective sensitivity of the dual receiver. Thus, there is a need to reduce the noise or instability associated with local oscillators tuned to about the same frequency.

SUMMARY OF THE EMBODIMENTS

The present invention relates to a dual radio frequency (RF) receiver circuit that includes a first RF mixer and a second RF mixer. The first and second RF mixers may be fed from a common local oscillator or from two separate local oscillators. When fed from two separate local oscillators and when the first and the second RF mixers are receiving the same or nearly the same RF channel, the frequency of the RF channel is less than the frequency of one local oscillator and is greater than the frequency of the other local oscillator. This arrangement separates the frequencies of the local oscillators, thereby reducing noise, instability, or both, which may otherwise de-sensitize the dual RF receiver circuit. In one embodiment of the present invention, the frequency of each local oscillator is selected to be either less than or greater than the frequency of its respective RF channel based on maximizing the separation of the frequencies of the local oscillators. In an alternate embodiment of the present invention, the frequency of each local oscillator is selected to be either less than or greater than the frequency of its respective RF channel based on separating a frequency of a local oscillator from interfering RF signals, from spurious RF signals, from an image of an RF channel, or any combination thereof.

When fed from a common local oscillator, a frequency of an RF channel associated with one data stream may be greater than the frequency of the common local oscillator, whereas a frequency of an RF channel associated with another data stream may be less than the frequency of the common local oscillator. The dual RF receiver circuit may be used in a multi-mode wireless communications terminal, which may be capable of receiving highband third generation (3G) RF signals, transmitting highband 3G RF signals, receiving lowband 3G RF signals, transmitting lowband 3G RF signals, receiving highband Enhanced Data Rates for Global Evolution (EDGE) Evolution RF signals, transmitting highband EDGE Evolution RF signals, receiving lowband EDGE Evolution RF signals, transmitting lowband EDGE Evolution signals, or any combination thereof.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

FIGS. 2A and 2B are graphs illustrating first and second radio frequency (RF) receive signals according to one embodiment of the wireless communications terminal.

FIGS. 3A and 3B are graphs illustrating the wireless communications terminal of FIG. 1 in a first mixer operating mode.

FIG. 3C is a graph illustrating the wireless communications terminal of FIG. 1 in a second mixer operating mode.

FIG. 4A is a graph illustrating the wireless communications terminal of FIG. 1 in the first mixer operating mode in the presence of an interfering RF signal.

FIG. 4B is a graph illustrating the wireless communications terminal of FIG. 1 in a third mixer operating mode.

FIG. 5A is a graph illustrating the wireless communications terminal of FIG. 1 in the first mixer operating mode in the presence of a spurious RF signal.

FIG. 5B is a graph illustrating the wireless communications terminal of FIG. 1 in a fourth mixer operating mode.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention relates to a dual radio frequency (RF) receiver circuit that includes a first RF mixer and a second RF mixer. The first and second RF mixers may be fed from a common local oscillator or from two separate local oscillators. When fed from two separate local oscillators and when the first and second RF mixers are receiving the same or nearly the same RF channel, the frequency of the RF channel is less than the frequency of one local oscillator and is greater than the frequency of the other local oscillator. This arrangement separates the frequencies of the local oscillators, thereby reducing noise, instability, or both, which may otherwise de-sensitize the dual RF receiver circuit. In one embodiment of the present invention, the frequency of each local oscillator is selected to be either less than or greater than the frequency of its respective RF channel based on maximizing the separation of the frequencies of the local oscillators. In an alternate embodiment of the present invention, the frequency of each local oscillator is selected to be either less than or greater than the frequency of its respective RF channel based on separating a frequency of a local oscillator from interfering RF signals, from spurious RF signals, from an image of an RF channel, or any combination thereof.

When fed from a common local oscillator, a frequency of an RF channel associated with one data stream may be greater than the frequency of the common local oscillator, whereas a frequency of an RF channel associated with another data stream may be less than the frequency of the common local oscillator. The dual RF receiver circuit may be used in a multi-mode wireless communications terminal, which may be capable of receiving highband third generation (3G) RF signals, transmitting highband 3G RF signals, receiving lowband 3G RF signals, transmitting lowband 3G RF signals, receiving highband Enhanced Data-Rates for Enhanced Data Rates for Global Evolution (EDGE) Evolution RF signals, transmitting highband EDGE Evolution RF signals, receiving lowband EDGE Evolution RF signals, transmitting lowband EDGE Evolution signals, or any combination thereof.

Figure 1:
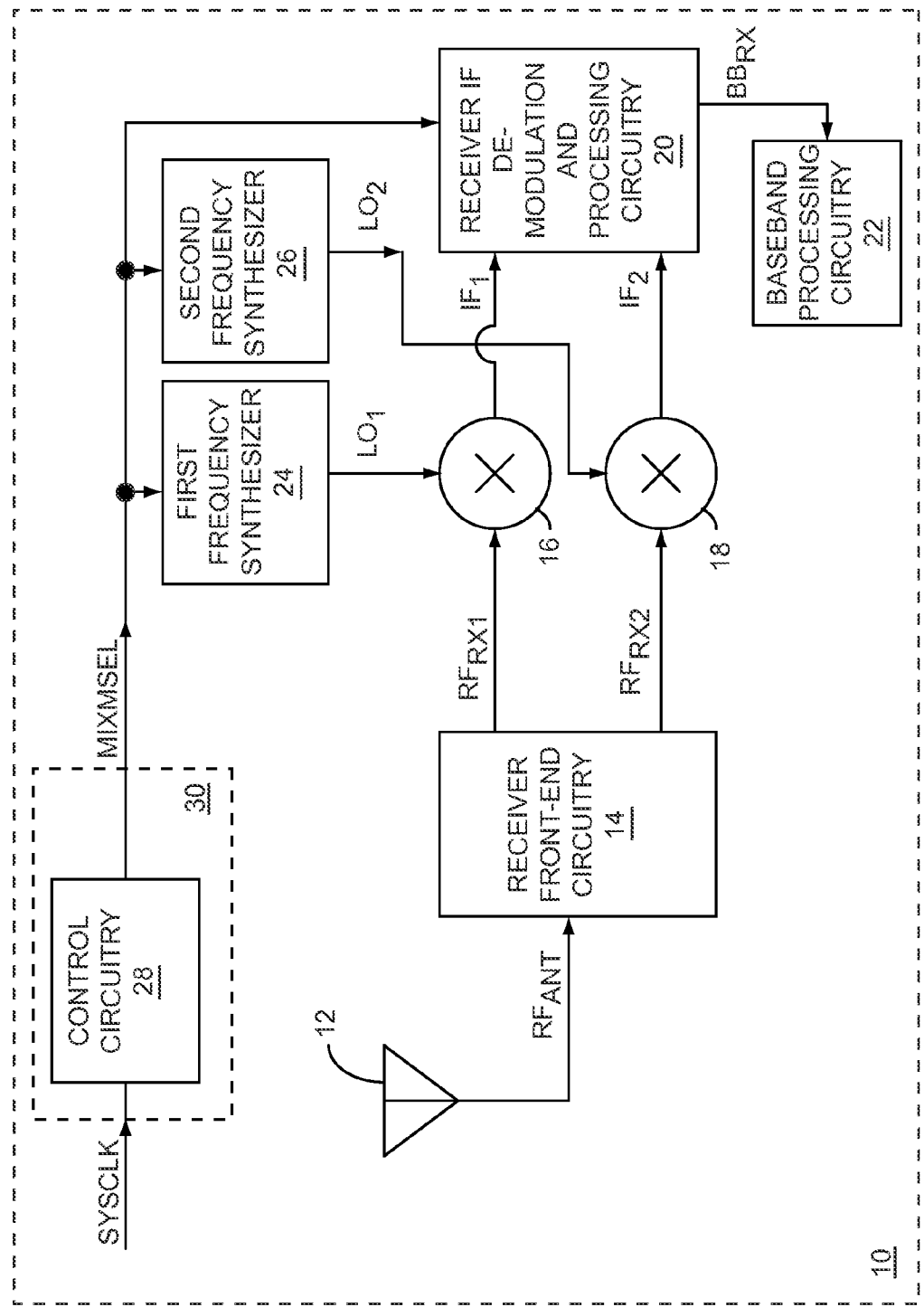
FIG. 1 shows a wireless communications terminal according to one embodiment of the present invention.

FIG. 1 shows a wireless communications terminal 10 according to one embodiment of the present invention. The wireless communications terminal 10 includes an antenna 12, which receives and provides an RF antenna signal $RF_{ANT}$ to receiver front-end circuitry 14. The receiver front-end circuitry 14 provides first and second RF receive signals $RF_{RX1}$, $RF_{RX2}$ to first and second RF mixers 16, 18, respectively, based on the RF antenna signal $RF_{ANT}$. The first and second RF mixers 16, 18 down-convert the first and second RF receive signals $RF_{RX1}$, $RF_{RX2}$ to provide first and second intermediate frequency (IF) signals $IF_1$, $IF_2$, respectively, by mixing the first and second RF receive signals $RF_{RX1}$, $RF_{RX2}$ with first and second local oscillator signals $LO_1$, $LO_2$, respectively. The first and second RF mixers 16, 18 feed the first and second IF signals $IF_1$, $IF_2$, respectively, to receiver IF de-modulation and processing circuitry 20, which further down-converts, de-modulates, or both, the first and second IF signals $IF_1$, $IF_2$ to extract modulated data that was embedded in the RF antenna signal $RF_{ANT}$.

The receiver IF de-modulation and processing circuitry 20 provides a receive baseband signal $BB_{RX}$, which is based on the modulated data, to baseband processing circuitry 22. A first and a second frequency synthesizer 24, 26 provide the first and second local oscillator signals $LO_1$, $LO_2$, respectively. Control circuitry 28 selects a mixer operating mode and provides a mixer mode select signal MIXMSEL, which is based on the mixer operating mode, to the first and second frequency synthesizers 24, 26, and to the receiver IF de-modulation and processing circuitry 20. The wireless communications terminal 10 may include system circuitry 30, which may be driven by a system clock signal SYSCLK. The system circuitry 30 may include the control circuitry 28, which may be driven by the system clock signal SYSCLK.

The first and second RF mixers 16, 18 may be part of a dual receiver, which may enable continuous data reception. In one embodiment of the wireless communications terminal 10, EDGE Evolution data is received by the antenna 12. The EDGE Evolution data is received in two data streams, such that each data stream has its own set of RF channels for frequency diversity. Transmission and reception may alternate between the two data streams as each data stream switches its RF channel, such that only one data stream is transmitted at a time For example, a first data stream is received on one of a first set of RF channels followed by a second data stream received on one of a second set of RF channels. Then, the first data stream is received on another of the first set of RF channels followed by the second data stream received on another of the second set of RF channels, and so on. While the first data stream is being received by a first side of the dual receiver, a second side of the dual receiver is switching RF channels in preparation to receive the second data stream. Then, while the second data stream is being received by the second side of the dual receiver, a first side of the dual receiver is switching RF channels in preparation to receive the first data stream. Since data is being received by one side of the dual receiver while the other side of the dual receiver is switching RF channels, this approach allows continuous reception of data.

FIGS. 2A and 2B are graphs illustrating the first and second RF receive signals $RF_{RX1}$, $RF_{RX2}$, which contain the first and second data streams, respectively. The first data stream includes a first data slot 32, which is immediately followed by a second data slot 34 in the second data stream. The second data slot 34 is immediately followed by a third data slot 36 in the first data stream, and the third data slot 36 is immediately followed by a fourth data slot 38 in the second data stream, and so on. Reception of the first, second, third, and fourth data slots 32, 34, 36, 38 provides a continuous flow of data. In alternate embodiments of the wireless communications terminal 10, communications protocols other than EDGE Evolution may be used to receive data using two or more data streams.

FIG. 3A is a graph illustrating the wireless communications terminal 10 of FIG. 1 in a first mixer operating mode. The antenna 12 is receiving a first wanted RF signal, which is included in the first RF receive signal $RF_{RX1}$, having a first wanted center frequency $F_{W1}$ and a second wanted RF signal, which is included in the second RF receive signal $RF_{RX2}$, having a second wanted center frequency $F_{W2}$. The first wanted RF signal includes the first data stream and the second wanted RF signal includes the second data stream. The first RF receive signal $RF_{RX1}$ is based on the first wanted RF signal and the second RF receive signal $RF_{RX2}$ is based on the second wanted RF signal. The first wanted RF signal is on one RF channel and the second wanted RF signal is on an adjacent RF channel, such that the second wanted center frequency $F_{W2}$ is greater than the first wanted center frequency $F_{W1}$. The difference between the first and second wanted center frequencies $F_{W1}, F_{W2}$ is a channel spacing 40.

The first local oscillator signal $LO_1$ has a first local oscillator frequency $F_{LO1}$, and the second local oscillator signal $LO_2$ has a second local oscillator frequency $F_{LO2}$. When the first RF mixer 16 mixes the first RF receive signal $RF_{RX1}$ and the first local oscillator signal $LO_1$, the first IF signal $IF_1$ has IF sub-signals at two different center frequencies. The center frequency of one IF sub-signal is at the sum of the first wanted center frequency $F_{W1}$ and the first local oscillator frequency $F_{LO1}$, and the center frequency of the other IF sub-signal is at the difference between the first wanted center frequency $F_{W1}$ and the first local oscillator frequency $F_{LO1}$. The IF sub-signal at the sum of the first wanted center frequency $F_{W1}$ and the first local oscillator frequency $F_{LO1}$ is removed by the receiver IF de-modulation and processing circuitry 20. The IF sub-signal at the difference between the first wanted center frequency $F_{W1}$ and the first local oscillator frequency $F_{LO1}$ is processed by the receiver IF de-modulation and processing circuitry 20. The difference between the first wanted center frequency $F_{W1}$ and the first local oscillator frequency $F_{LO1}$ is a first IF center frequency $F_{IF1}$.

Similarly, when the second RF mixer 18 mixes the second RF receive signal $RF_{RX2}$ and the second local oscillator signal $LO_2$, the second IF signal $IF_2$ has IF sub-signals at two different center frequencies. The center frequency of one IF sub-signal is at the sum of the second wanted center frequency $F_{W2}$ and the second local oscillator frequency $F_{LO2}$, and the center frequency of the other IF sub-signal is at the difference between the second wanted center frequency $F_{W2}$ and the second local oscillator frequency $F_{LO2}$. The IF sub-signal at the sum of the second wanted center frequency $F_{W2}$ and the second local oscillator frequency $F_{LO2}$ is removed by the receiver IF de-modulation and processing circuitry 20. The IF sub-signal at the difference between the second wanted center frequency $F_{W2}$ and the second local oscillator frequency $F_{LO2}$ is processed by the receiver IF de-modulation and processing circuitry 20. The difference between the second wanted center frequency $F_{W2}$ and the second local oscillator frequency $F_{LO2}$ is a second IF center frequency $F_{IF2}$.

The first local oscillator frequency $F_{LO1}$ may be either greater than or less than the first wanted center frequency $F_{W1}$.

Similarly, the second local oscillator frequency $F_{LO2}$ may be either greater than or less than the second wanted center frequency $F_{W2}$. In the first mixer operating mode, the first local oscillator frequency $F_{LO1}$ is less than the first wanted center frequency $F_{W1}$, and the second local oscillator frequency $F_{LO2}$ is greater than the second wanted center frequency $F_{W2}$. When the second wanted center frequency $F_{W2}$ is greater than or equal to the first wanted center frequency $F_{W1}$, the first mixer operating mode provides the greatest separation between the first local oscillator frequency $F_{LO1}$ and the second local oscillator frequency $F_{LO2}$; therefore, the first mixer operating mode was selected. If the first local oscillator frequency $F_{LO1}$ is greater than the first wanted center frequency $F_{W1}$, the second local oscillator frequency $F_{LO2}$ is less than the second wanted center frequency $F_{W2}$, or both, the separation between the first local oscillator frequency $F_{LO1}$ and the second local oscillator frequency $F_{LO2}$ may be insufficient to prevent an unacceptable level of noise, instability, or both, as a result of interaction between the first and second frequency synthesizers 24, 26.

FIG. 3B is a graph illustrating the wireless communications terminal 10 of FIG. 1 in a first mixer operating mode. The antenna 12 is receiving the first wanted RF signal, which is included in the first RF receive signal $RF_{RX1}$, having the first wanted center frequency $F_{W1}$ and the second wanted RF signal, which is included in the second RF receive signal $RF_{RX2}$, having the second wanted center frequency $F_{W2}$. The first wanted RF signal includes the first data stream and the second wanted RF signal includes the second data stream. The first RF receive signal $RF_{RX1}$ is based on the first wanted RF signal and the second RF receive signal $RF_{RX2}$ is based on the second wanted RF signal. The first wanted RF signal and the second wanted RF signal are both on the same RF channel, such that the second wanted center frequency $F_{W2}$ is about equal to the first wanted center frequency $F_{W1}$. The first mixer operating mode was selected to provide the greatest separation between the first local oscillator frequency $F_{LO1}$ and the second local oscillator frequency $F_{LO2}$.

FIG. 3C is a graph illustrating the wireless communications terminal 10 of FIG. 1 in a second mixer operating mode. The antenna 12 is receiving the first wanted RF signal, which is included in the first RF receive signal $RF_{RX1}$, having the first wanted center frequency $F_{W1}$ and the second wanted RF signal, which is included in the second RF receive signal $RF_{RX2}$, having the second wanted center frequency $F_{W2}$. The first wanted RF signal includes the first data stream and the second wanted RF signal includes the second data stream. The first RF receive signal $RF_{RX1}$ is based on the first wanted RF signal and the second RF receive signal $RF_{RX2}$ is based on the second wanted RF signal. The first wanted RF signal is on one RF channel and the second wanted RF signal is on an adjacent RF channel, such that the second wanted center frequency $F_{W2}$ is less than the first wanted center frequency $F_{W1}$. The difference between the first and second wanted center frequencies $F_{W1}, F_{W2}$ is the channel spacing 40.

In the second mixer operating mode, the first local oscillator frequency $F_{LO1}$ is greater than the first wanted center frequency $F_{W1}$, and the second local oscillator frequency $F_{LO2}$ is less than the second wanted center frequency $F_{W2}$. When the second wanted center frequency $F_{W2}$ is less than or equal to the first wanted center frequency $F_{W1}$, the second mixer operating mode provides the greatest separation between the first local oscillator frequency $F_{LO1}$ and the second local oscillator frequency $F_{LO2}$; therefore, the second mixer operating mode was selected. If the first local oscillator frequency $F_{LO1}$ is less than the first wanted center frequency $F_{W1}$, the second local oscillator frequency $F_{LO2}$ is greater than the second wanted center frequency $F_{W2}$, or both, the separation between the first local oscillator frequency $F_{LO1}$ and the second local oscillator frequency $F_{LO2}$ may be insufficient to prevent an unacceptable level of noise, instability, or both, as a result of interaction between the first and second frequency synthesizers 24, 26.

FIG. 4A is a graph illustrating the wireless communications terminal 10 of FIG. 1 in the first mixer operating mode in the presence of an interfering RF signal $RF_{INT}$. The second wanted RF signal, which is included in the second RF receive signal $RF_{RX2}$, is separated from the first wanted RF signal, which is included in the first RF receive signal $RF_{RX1}$, by three RF channels; therefore, the difference between the first wanted center frequency $F_{W1}$ and the second wanted center frequency $F_{W2}$ is equal to about three channel spacings 40, which provides greater than three channel spacings 40 between the first local oscillator frequency $F_{LO1}$ and the second local oscillator frequency $F_{LO2}$.

Since the second local oscillator frequency $F_{LO2}$ is greater than the second wanted center frequency $F_{W2}$, the second RF mixer 18 has an image frequency $F_{IMAGE}$ of the second wanted center frequency $F_{W2}$ that is greater than the second local oscillator frequency $F_{LO2}$. The difference between the image frequency $F_{IMAGE}$ and the second local oscillator frequency $F_{LO2}$ is the second IF center frequency $F_{IF2}$. Any received signals at the image frequency $F_{IMAGE}$ may interfere with proper reception of the second wanted RF signal. As illustrated in FIG. 4A, the frequency of the interfering RF signal $RF_{INT}$ is about equal to the image frequency $F_{IMAGE}$; therefore, the interfering RF signal $RF_{INT}$ may interfere with proper reception of the second wanted RF signal. To minimize effects of the interfering RF signal $RF_{INT}$, a different mixer operating mode may be selected to move the image frequency $F_{IMAGE}$ away from the frequency of the interfering RF signal $RF_{INT}$.

FIG. 4B is a graph illustrating the wireless communications terminal 10 of FIG. 1 in a third mixer operating mode. The first and second wanted RF signals, which are included in the first and second RF receive signals $RF_{RX1}$, $RF_{RX2}$, and the interfering RF signal $RF_{INT}$ are unchanged from FIG. 4A. However, in the third mixer operating mode, both the first and the second local oscillator frequencies $F_{LO1}$, $F_{LO2}$ are less than the first and the second wanted center frequencies $F_{W1}$, $F_{W2}$, respectively. By moving the second local oscillator frequency $F_{LO2}$ from being greater than the second wanted center frequency $F_{W2}$ to being less than the second wanted center frequency $F_{W2}$, the image frequency $F_{IMAGE}$ is moved away from the frequency of the interfering RF signal $RF_{INT}$. However, the separation between the first and the second local oscillator frequencies $F_{LO1}$, $F_{LO2}$ is reduced, which may be problematic in some situations. Since the separation between the first wanted center frequency $F_{W1}$ and the second wanted center frequency $F_{W2}$ is equal to about three channel spacings 40, the first and second local oscillator signals $LO_1$, $LO_2$, may not interfere with one another. In some embodiments of the present invention, mixer operating mode selection may be based on a trade-off between increasing the separation between the first and the second local oscillator frequencies $F_{LO1}$, $F_{LO2}$ and increasing the separation between an image frequency $F_{IMAGE}$ and a frequency of an interfering RF signal $RF_{INT}$.

FIG. 5A is a graph illustrating the wireless communications terminal 10 of FIG. 1 in the first mixer operating mode in the presence of a spurious RF signal $RF_{SPUR}$. The second wanted RF signal, which is included in the second RF receive signal $RF_{RX2}$, is separated from the first wanted RF signal, which is included in the first RF receive signal $RF_{RX1}$, by three RF channels; therefore, the difference between the first wanted center frequency $F_{W1}$ and the second wanted center frequency $F_{W2}$ is equal to about three channel spacings 40, which provides greater than three channel spacings 40 between the first local oscillator frequency $F_{LO1}$ and the second local oscillator frequency $F_{LO2}$.

The spurious RF signal $RF_{SPUR}$ may be a harmonic of the system clock signal SYSCLK and may be coupled into the signal path of receive circuitry through circuit parasitics. As illustrated in FIG. 5A, the frequency of the spurious RF signal $RF_{SPUR}$ is about equal to the first local oscillator frequency $F_{LO1}$; therefore, the spurious RF signal $RF_{SPUR}$ may interfere with proper reception of the first wanted RF signal. To minimize effects of the spurious RF signal $RF_{SPUR}$, a different mixer operating mode may be selected to move the first local oscillator frequency $F_{LO1}$ away from the frequency of the spurious RF signal $RF_{SPUR}$.

FIG. 5B is a graph illustrating the wireless communications terminal 10 of FIG. 1 in a fourth mixer operating mode. The first and second wanted RF signals, which are included in the first and second RF receive signals $RF_{RX1}$, $RF_{RX2}$, and the spurious RF signal $RF_{SPUR}$ are unchanged from FIG. 5A. However, in the fourth mixer operating mode, both the first and the second local oscillator frequencies $F_{LO1}$, $F_{LO2}$ are greater than the first and the second wanted center frequencies $F_{W1}$, $F_{W2}$, respectively. By moving the first local oscillator frequency $F_{LO1}$ from being less than the first wanted center frequency $F_{W1}$ to being greater than the first wanted center frequency $F_{W1}$, the first local oscillator frequency $F_{LO1}$ is moved away from the frequency of the spurious RF signal $RF_{SPUR}$. However, the separation between the first and the second local oscillator frequencies $F_{LO1}$, $F_{LO2}$ is reduced, which may be problematic in some situations. Since the separation between the first wanted center frequency $F_{W1}$ and the second wanted center frequency $F_{W2}$ is equal to about three channel spacings 40, the first and second local oscillator signals $LO_1$, $LO_2$, may not interfere with one another. In some embodiments of the present invention, mixer operating mode selection may be based on a trade-off between increasing the separation between the first and the second local oscillator frequencies $F_{LO1}$, $F_{LO2}$ and increasing the separation between one of the first and the second local oscillator frequencies $F_{LO1}$, $F_{LO2}$ and a frequency of a spurious RF signal $RF_{SPUR}$.

In some embodiments of the present invention, any of the mixer operating modes may be omitted, selection of the mixer operating mode may be based on providing adequate separation between the first and the second local oscillator frequencies $F_{LO1}$, $F_{LO2}$, substantially maximizing separation between the first and the second local oscillator frequencies $F_{LO1}$, $F_{LO2}$, providing adequate separation between the first local oscillator frequency $F_{LO1}$ and a frequency of a spurious RF signal $RF_{SPUR}$, providing adequate separation between the second local oscillator frequency $F_{LO2}$ and a frequency of a spurious RF signal $RF_{SPUR}$, providing adequate separation between an image frequency $F_{IMAGE}$ of the first wanted center frequency $F_{W1}$ and a frequency of an interfering RF signal $RF_{INT}$, providing adequate separation between an image frequency $F_{IMAGE}$ of the second wanted center frequency $F_{W2}$ and a frequency of an interfering RF signal $RF_{INT}$, or any combination thereof.

Figure 6:
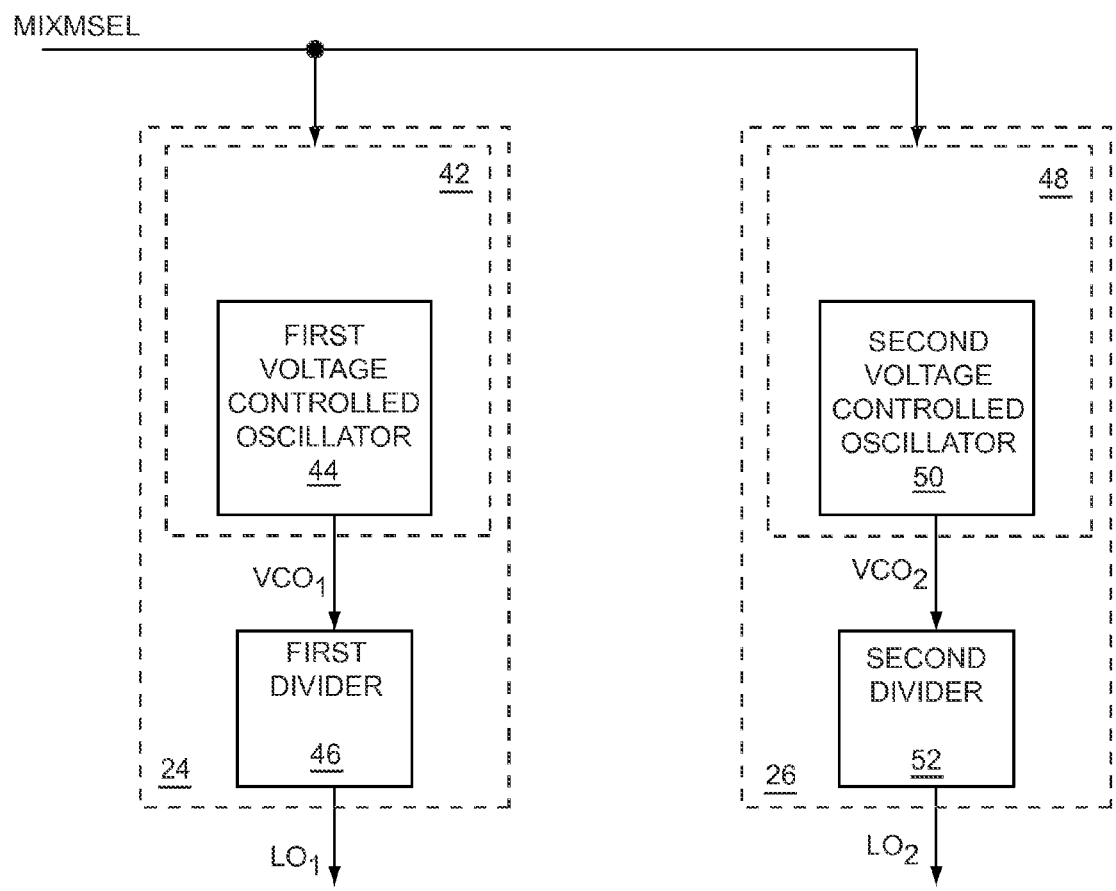
FIG. 6 shows details of first and second frequency synthesizers illustrated in FIG. 1.

FIG. 6 shows details of the first and second frequency synthesizers 24, 26 illustrated in FIG. 1. The first frequency synthesizer 24 includes a first phase-locked loop 42 having a first voltage controlled oscillator (VCO) 44, which provides a first VCO signal $VCO_1$ to a first divider 46. The first phase-locked loop 42 includes frequency synthesis circuitry, such as the first VCO 44, for synthesizing any needed frequencies for the first VCO signal VCO$_1$. The first divider 46 divides the first VCO signal VCO$_1$ to provide the first local oscillator signal LO$_1$. Similarly, the second frequency synthesizer 26 includes a second phase-locked loop 48 having a second VCO 50, which provides a second VCO signal VCO$_2$ to a second divider 52. The second phase-locked loop 48 includes frequency synthesis circuitry, such as the second VCO 50, for synthesizing any needed frequencies for the second VCO signal VCO$_2$. The second divider 52 divides the second VCO signal VCO$_2$ to provide the second local oscillator signal LO$_2$. The first and second phase-locked loops 42, 48 are used to synthesize any frequencies needed to receive specific RF channels. However, the first and second VCOs 44, 50 may be particularly susceptible to circuit parasitics and may interfere with each other when separation between the first and second VCO signals VCO$_1$, VCO$_2$ is inadequate. By including the first and second dividers 46, 52, differences between the first and second local oscillator frequencies $F_{LO1}$, $F_{LO2}$ are multiplied between the first and second VCO signals VCO$_1$, VCO$_2$.

In a first exemplary embodiment of the present invention, the wireless communications terminal 10 of FIG. 1 is in a first mixer operating mode as illustrated in FIG. 3A. The channel spacing 40 is about 200 kilohertz, the first and second IF center frequencies $F_{IF1}$, $F_{IF2}$ are between about 120 kilohertz and 175 kilohertz, and the first and second dividers 46, 52 are divide-by-one dividers. Therefore, the difference between the first and second local oscillator frequencies $F_{LO1}$, $F_{LO2}$ is between about 440 kilohertz and 550 kilohertz.

In a second exemplary embodiment of the present invention, the wireless communications terminal 10 of FIG. 1 is in a first mixer operating mode as illustrated in FIG. 3A. The channel spacing 40 is about 200 kilohertz, the first and second IF center frequencies $F_{IF1}$, $F_{IF2}$ are between about 120 kilohertz and 175 kilohertz, and the first and second dividers 46, 52 are divide-by-two dividers. Therefore, the difference between the first and second local oscillator frequencies $F_{LO1}$, $F_{LO2}$ is between about 880 kilohertz and 1100 kilohertz.

In a third exemplary embodiment of the present invention, the wireless communications terminal 10 of FIG. 1 is in a first mixer operating mode as illustrated in FIG. 3A. The channel spacing 40 is about 200 kilohertz, the first and second IF center frequencies $F_{IF1}$, $F_{IF2}$ are between about 120 kilohertz and 175 kilohertz, and the first and second dividers 46, 52 are divide-by-four dividers. Therefore, the difference between the first and second local oscillator frequencies $F_{LO1}$, $F_{LO2}$ is between about 1760 kilohertz and 2200 kilohertz.

Figure 7:
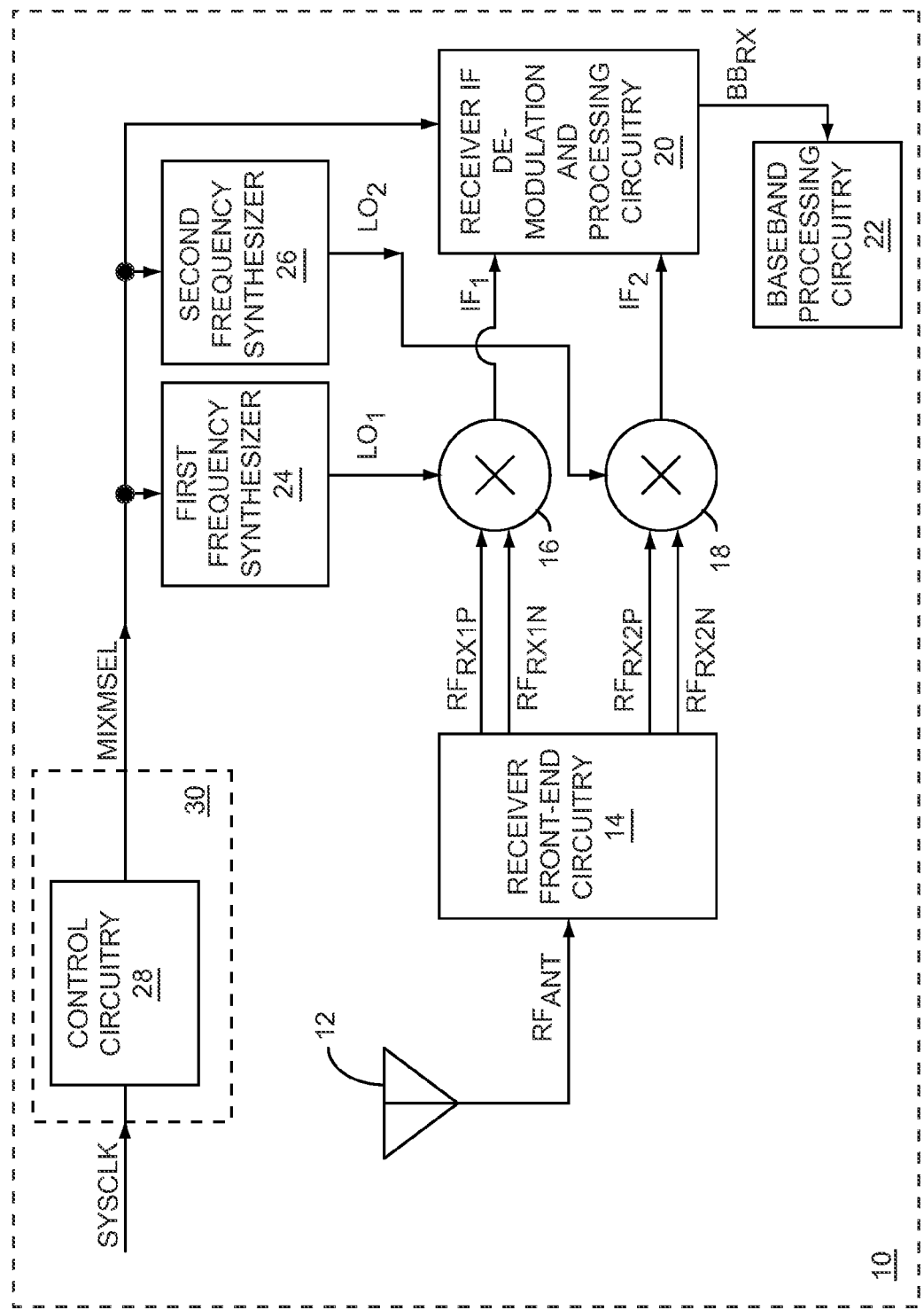
FIG. 7 shows the wireless communications terminal according to an alternate embodiment of the present invention.

FIG. 7 shows the wireless communications terminal 10 according to an alternate embodiment of the present invention. The wireless communications terminal 10 is similar to the wireless communications terminal 10 illustrated in FIG. 1, except that in FIG. 1 the first and second RF receive signals $RF_{RX1}$, $RF_{RX2}$ are single-ended signals, whereas in FIG. 7 the RF receive signals $RF_{RX1}$, $RF_{RX2}$ are replaced with differential signals. Specifically, the first RF receive signal $RF_{RX1}$ is replaced with a first positive RF receive signal $RF_{RX1P}$ and a first negative RF receive signal $RF_{RX1N}$. Similarly, the second RF receive signal $RF_{RX2}$ is replaced with a second positive RF receive signal $RF_{RX2P}$ and a second negative RF receive signal $RF_{RX2N}$. The first positive RF receive signal $RF_{RX1P}$ is phase-shifted from the first negative RF receive signal $RF_{RX1N}$ by about 180 degrees. Similarly, the second positive RF receive signal $RF_{RX2P}$ is phase-shifted from the second negative RF receive signal $RF_{RX2N}$ by about 180 degrees. In other embodiments of the present invention, any of the first and second local oscillator signals LO$_1$, LO$_2$ and the first and second IF signals IF$_1$, IF$_2$ may be differential signals.

Figure 8:
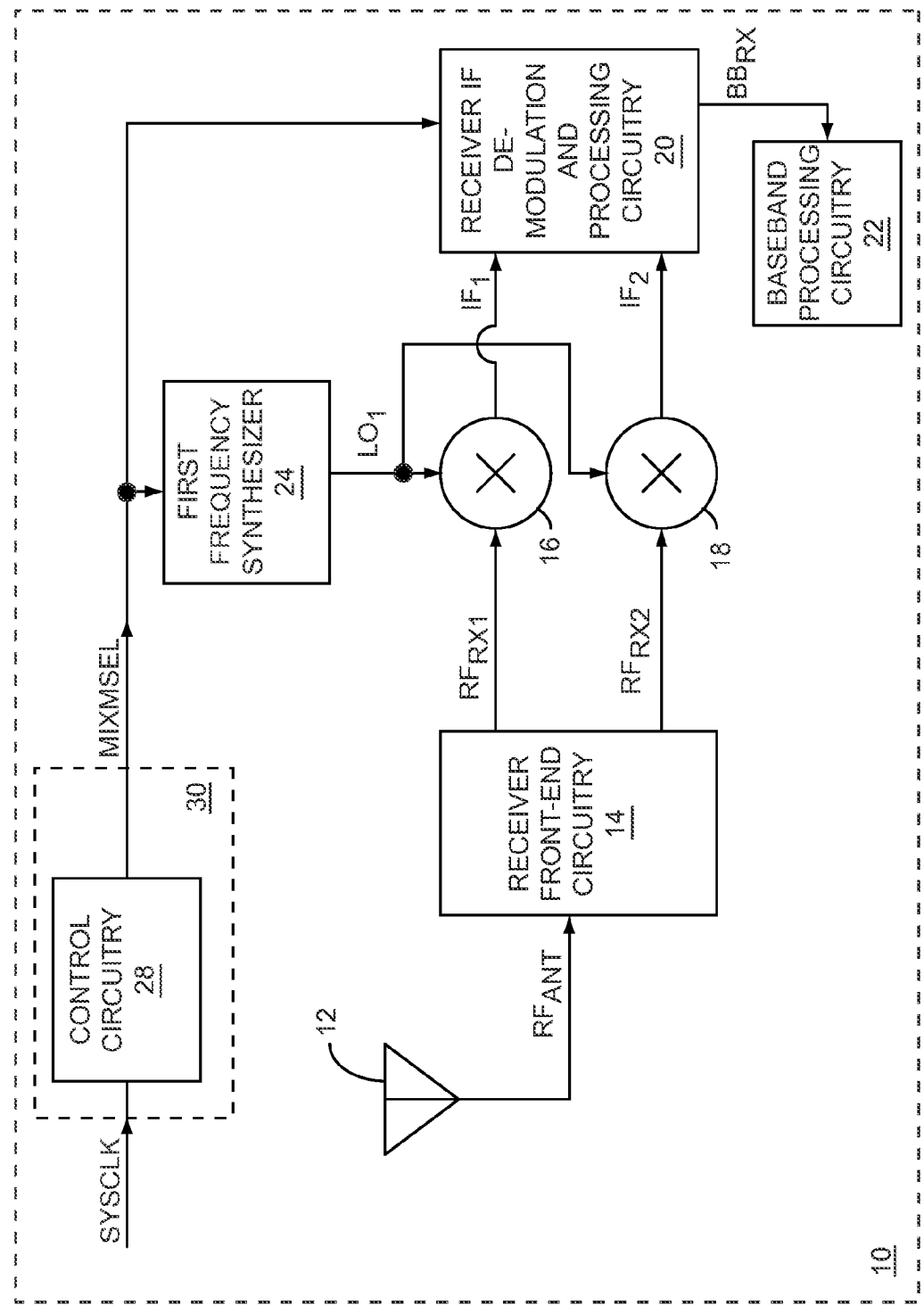
FIG. 8 shows the wireless communications terminal according to an additional embodiment of the present invention.

FIG. 8 shows the wireless communications terminal 10 according to an additional embodiment of the present invention. The wireless communications terminal 10 is similar to the wireless communications terminal 10 illustrated in FIG. 1, except that in FIG. 8 the second frequency synthesizer 26 has been omitted. The second RF mixer 18 is fed with the first local oscillator signal LO$_1$ instead of the second local oscillator signal LO$_2$.

Figure 9:
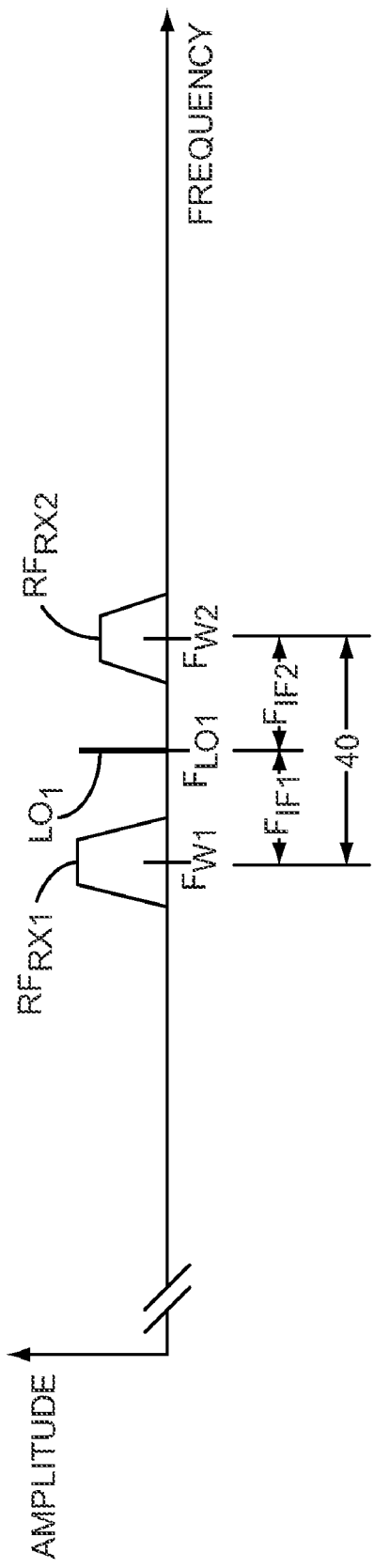
FIG. 9 is a graph illustrating operation of the wireless communications terminal of FIG. 8.

FIG. 9 is a graph illustrating operation of the wireless communications terminal 10 of FIG. 8. Since only the first local oscillator signal LO$_1$ is available, the difference between the first local oscillator frequency $F_{LO1}$ and the first wanted center frequency $F_{W1}$ is the first IF center frequency $F_{IF1}$, and the difference between the first local oscillator frequency $F_{LO1}$ and the second wanted center frequency $F_{W2}$ is the second IF center frequency $F_{IF2}$. If the first and second IF center frequencies $F_{IF1}$, $F_{IF2}$ are about equal and constant, then only four combinations are possible. In the first combination, the first wanted center frequency $F_{W1}$ is less than the first local oscillator frequency $F_{LO1}$, the second wanted center frequency $F_{W2}$ is greater than the first local oscillator frequency $F_{LO1}$, and the difference between the first and second wanted center frequencies $F_{W1}$, $F_{W2}$ is the channel spacing 40, as illustrated in FIG. 9.

In the second combination (not shown), the first wanted center frequency $F_{W1}$ is greater than the first local oscillator frequency $F_{LO1}$, the second wanted center frequency $F_{W2}$ is less than the first local oscillator frequency $F_{LO1}$, and the difference between the first and second wanted center frequencies $F_{W1}$, $F_{W2}$ is the channel spacing 40. In the third combination (not shown), both the first and second wanted RF signals are on the same RF channel and the first and second wanted center frequencies $F_{W1}$, $F_{W2}$ are equal to one another and are less than the first local oscillator frequency $F_{LO1}$. In the fourth combination (not shown), both the first and second wanted RF signals are on the same RF channel and the first and second wanted center frequencies $F_{W1}$, $F_{W2}$ are equal to one another and are greater than the first local oscillator frequency $F_{LO1}$. Eliminating the second local oscillator signal LO$_2$ significantly restricts configuration combinations; however, without the second local oscillator signal LO$_2$, interactions between the first and second local oscillator signals LO$_1$, LO$_2$ are eliminated.

Figure 10:
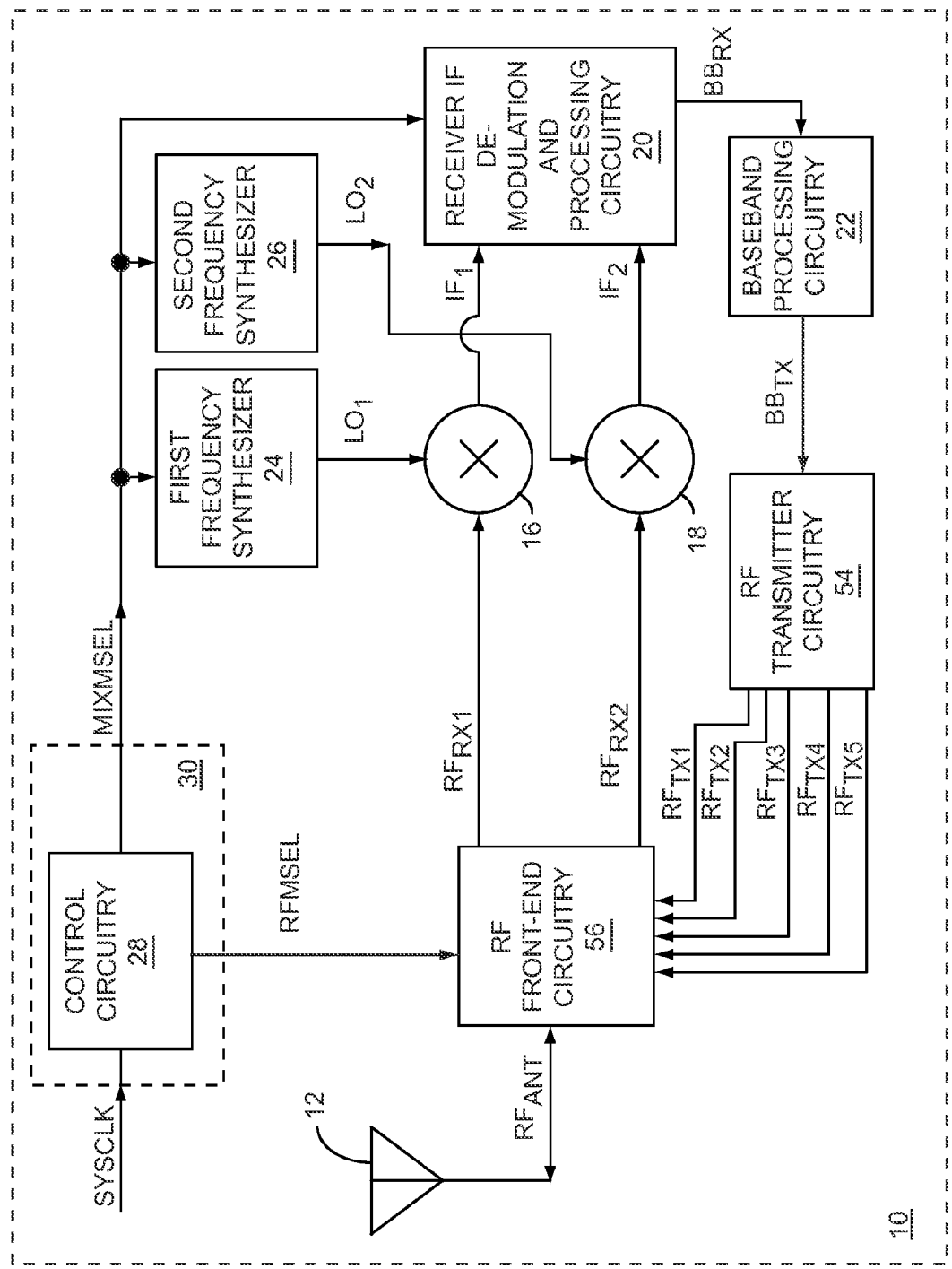
FIG. 10 shows RF transmitter circuitry added to the wireless communications terminal illustrated in FIG. 1.

FIG. 10 shows RF transmitter circuitry 54 added to the wireless communications terminal 10 illustrated in FIG. 1. The receiver front-end circuitry 14 is replaced with RF front-end circuitry 56. The wireless communications terminal 10 illustrated in FIG. 10 may be a multi-mode terminal capable of supporting multiple communications protocols. In an exemplary embodiment of the present invention, the wireless communications terminal 10 may operate using one or more EDGE Evolution communications protocols, one or more 3G communications protocols, or any combination thereof. The baseband processing circuitry 22 provides a transmit baseband signal BB$_{TX}$, which includes data to be transmitted, to the RF transmitter circuitry 54. The RF transmitter circuitry 54 provides a first RF transmit signal $RF_{TX1}$, a second RF transmit signal $RF_{TX2}$, a third RF transmit signal $RF_{TX3}$, a fourth RF transmit signal $RF_{TX4}$, and a fifth RF transmit signal $RF_{TX5}$ to the RF front-end circuitry 56 based on the transmit baseband signal BB$_{TX}$.

The control circuitry 28 provides an RF mode select signal RFMSEL to the RF front-end circuitry 56 to select desired RF communication modes. When transmitting, receiving, or both, 3G signals, the wireless communications terminal 10 may be operating in a first RF operating mode, and when transmitting, receiving, or both, EDGE Evolution signals, the wireless communications terminal 10 may be operating in a second RF operating mode. The antenna 12 receives RF signals and provides the RF antenna signal $RF_{ANT}$ to the RF front-end circuitry 56 based on the received RF signals. The RF front-end circuitry 56 provides the first and second RF receive signals $RF_{RX1}$, $RF_{RX2}$ based on the RF antenna signal $RF_{ANT}$ and the RF mode select signal RFMSEL. The RF front-end circuitry 56 provides appropriate RF transmit signals to the antenna 12 using the RF antenna signal $RF_{ANT}$ based on one or more of the first, second, third, fourth, and fifth RF transmit signals $RF_{TX1}$, $RF_{TX2}$, $RF_{TX3}$, $RF_{TX4}$, $RF_{TX5}$ and the RF mode select signal RFMSEL.

Figure 11:
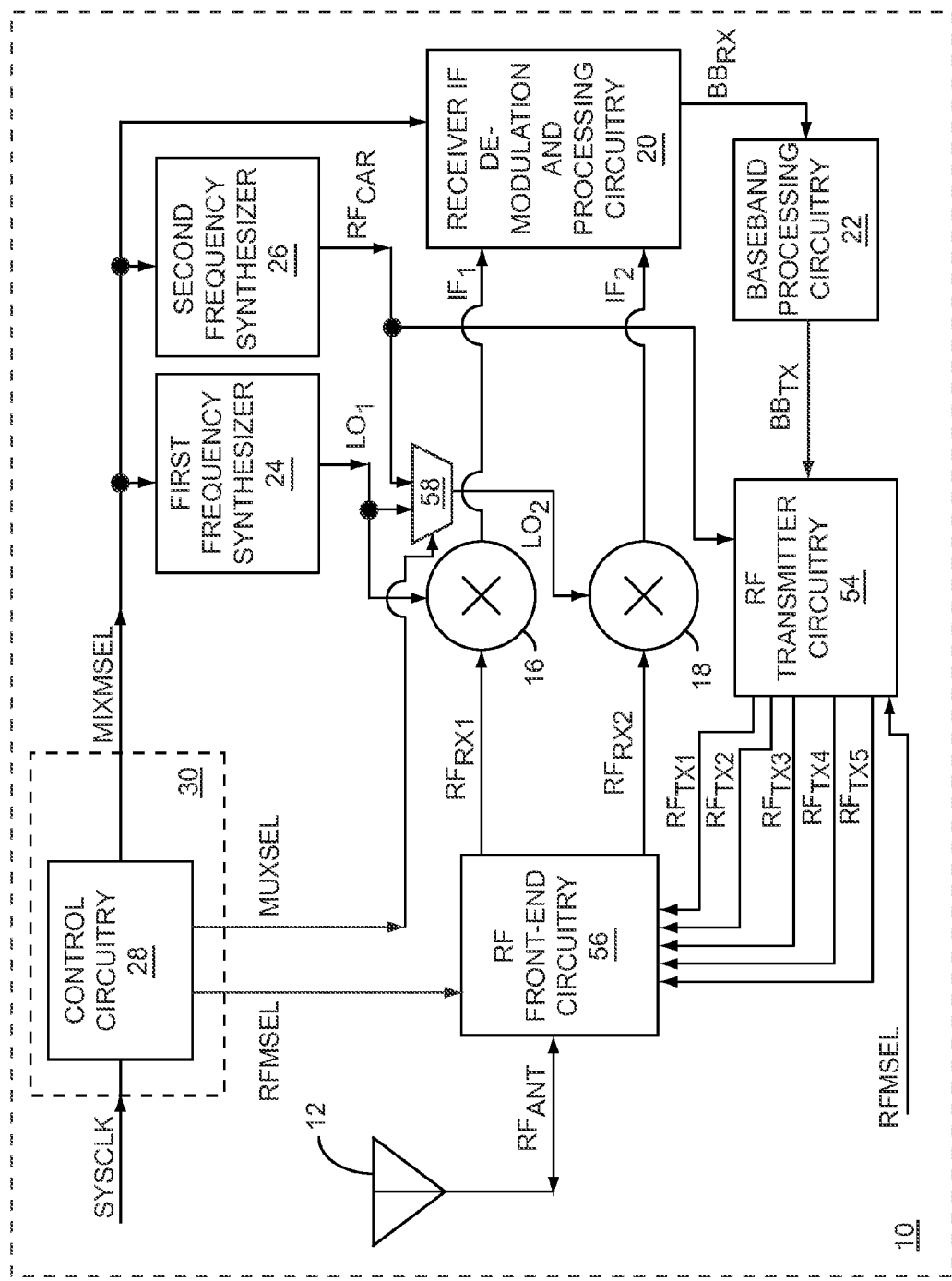
FIG. 11 shows the wireless communications terminal according to another embodiment of the present invention.

FIG. 11 shows the wireless communications terminal 10 according to another embodiment of the present invention. The wireless communications terminal 10 illustrated in FIG. 11 is similar to the wireless communications terminal 10 illustrated in FIG. 10 except that the second frequency synthesizer 26 provides an RF carrier signal $RF_{CAR}$ to the RF transmitter circuitry 54, and the second local oscillator signal $LO_2$ is based on either the first local oscillator signal $LO_1$ or the RF carrier signal $RF_{CAR}$. A multiplexer 58 receives the first local oscillator signal $LO_1$, the RF carrier signal $RF_{CAR}$, and a multiplexer select signal MUXSEL. The multiplexer 58 provides the second local oscillator signal $LO_2$ to the second RF mixer 18. The control circuitry 28 provides the multiplexer select signal MUXSEL, which is used to select either the first local oscillator signal $LO_1$ or the RF carrier signal $RF_{CAR}$ to provide the second local oscillator signal $LO_2$.

In an exemplary embodiment of the present invention, when the wireless communications terminal 10 is operating using a 3G communications protocol, since transmission and reception of RF signals may occur simultaneously, the multiplexer 58 is configured such that both the first and second RF mixers 16, 18 use the first local oscillator signal $LO_1$ for mixing and the RF transmitter circuitry 54 uses the RF carrier signal $RF_{CAR}$ for transmitting. When the wireless communications terminal 10 is operating using an EDGE Evolution communications protocol, since transmission and reception of RF signals do not occur simultaneously, the multiplexer 58 is configured such that the first RF mixer 16 uses the first local oscillator signal $LO_1$ for mixing, the second RF mixer 18 uses the RF carrier signal $RF_{CAR}$ for mixing, and the RF transmitter circuitry 54 uses the RF carrier signal $RF_{CAR}$ for transmitting. Since the second RF mixer 18 and the RF transmitter circuitry 54 share a frequency synthesizer, power, space, complexity, and noise are reduced.

Figure 12:
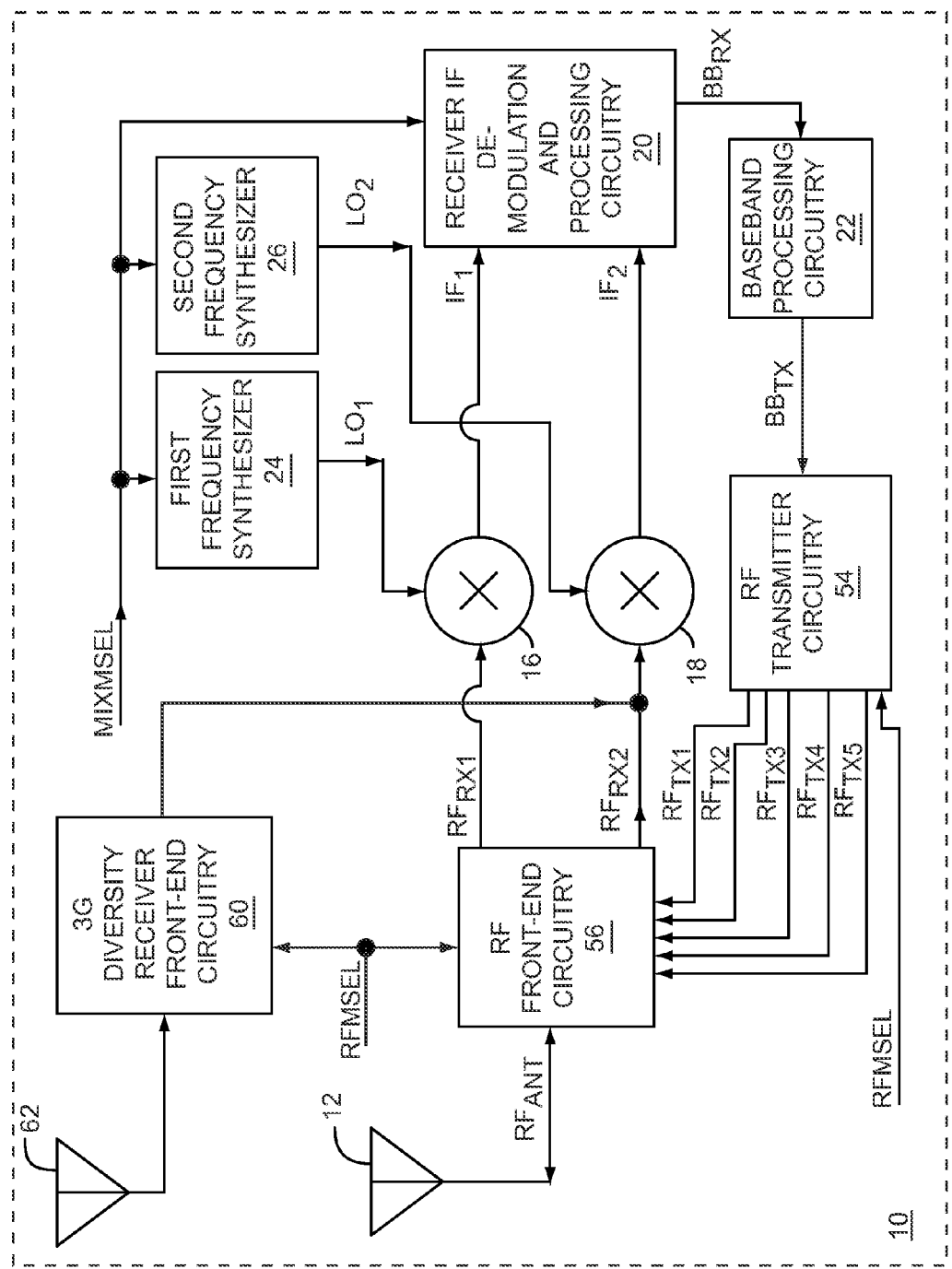
FIG. 12 shows third generation (3G) diversity receiver front-end circuitry added to the wireless communications terminal illustrated in FIG. 10.

FIG. 12 shows 3G diversity receiver front-end circuitry 60 added to the wireless communications terminal 10 illustrated in FIG. 10 according to one embodiment of the present invention. The 3G diversity receiver front-end circuitry 60 receives the RF mode select signal RFMSEL. A diversity antenna 62 receives RF signals, which are fed to the 3G diversity receiver front-end circuitry 60. The 3G diversity receiver front-end circuitry 60 provides the second RF receive signal $RF_{RX2}$ based on received RF signals and the RF mode select signal RFMSEL.

Since the first and second RF mixers 16, 18 receive the first and second local oscillator signals $LO_1$, $LO_2$ from the first and second frequency synthesizers, respectively, configuration flexibility is provided in receiving 3G normal signals and 3G diversity signals. Since 3G communications may include simultaneous transmission and reception of RF signals, the RF transmitter circuitry 54 may require a separate frequency synthesizer (not shown).

In an alternate embodiment of the present invention, the wireless communications terminal 10 may include the multiplexer 58 illustrated in FIG. 11. When transmitting and receiving 3G signals, the multiplexer select signal MUXSEL configures the multiplexer 58 to provide the second local oscillator signal $LO_2$ to the second RF mixer 18 based on the first local oscillator signal $LO_1$, and the second frequency synthesizer 26 provides the RF carrier signal $RF_{CAR}$ to the RF transmitter circuitry 54. When receiving EDGE Evolution signals, the multiplexer select signal MUXSEL configures the multiplexer 58 to provide the second local oscillator signal $LO_2$ to the second RF mixer 18 based on the RF carrier signal $RF_{CAR}$ from the second frequency synthesizer 26. Since EDGE Evolution signals are not transmitted and received simultaneously, the second frequency synthesizer 26 may be used to provide the RF carrier signal $RF_{CAR}$ to the RF transmitter circuitry 54 for transmitting EDGE Evolution signals, and the second frequency synthesizer 26 may be used to provide the second local oscillator signal $LO_2$ to the second RF mixer 18 for receiving EDGE Evolution signals.

In an exemplary embodiment of the present invention, when the wireless communications terminal 10 is operating using a 3G communications protocol, the 3G diversity receiver front-end circuitry 60 provides the second RF receive signal $RF_{RX2}$ based on received RF signals, and the RF front-end circuitry 56 does not provide the second RF receive signal $RF_{RX2}$. The RF front-end circuitry 56 may include switching circuitry to effectively disconnect the RF front-end circuitry 56 from the second RF mixer 18 when the 3G diversity receiver front-end circuitry 60 provides the second RF receive signal $RF_{RX2}$. When the wireless communications terminal 10 is operating using an EDGE Evolution communications protocol, the 3G diversity receiver front-end circuitry 60 does not provide the second RF receive signal $RF_{RX2}$, and the RF front-end circuitry 56 provides the second RF receive signal $RF_{RX2}$ based on received RF signals. The 3G diversity receiver front-end circuitry 60 may include switching circuitry to effectively disconnect the 3G diversity receiver front-end circuitry 60 from the second RF mixer 18 when the RF front-end circuitry 56 provides the second RF receive signal $RF_{RX2}$.

Figure 13:
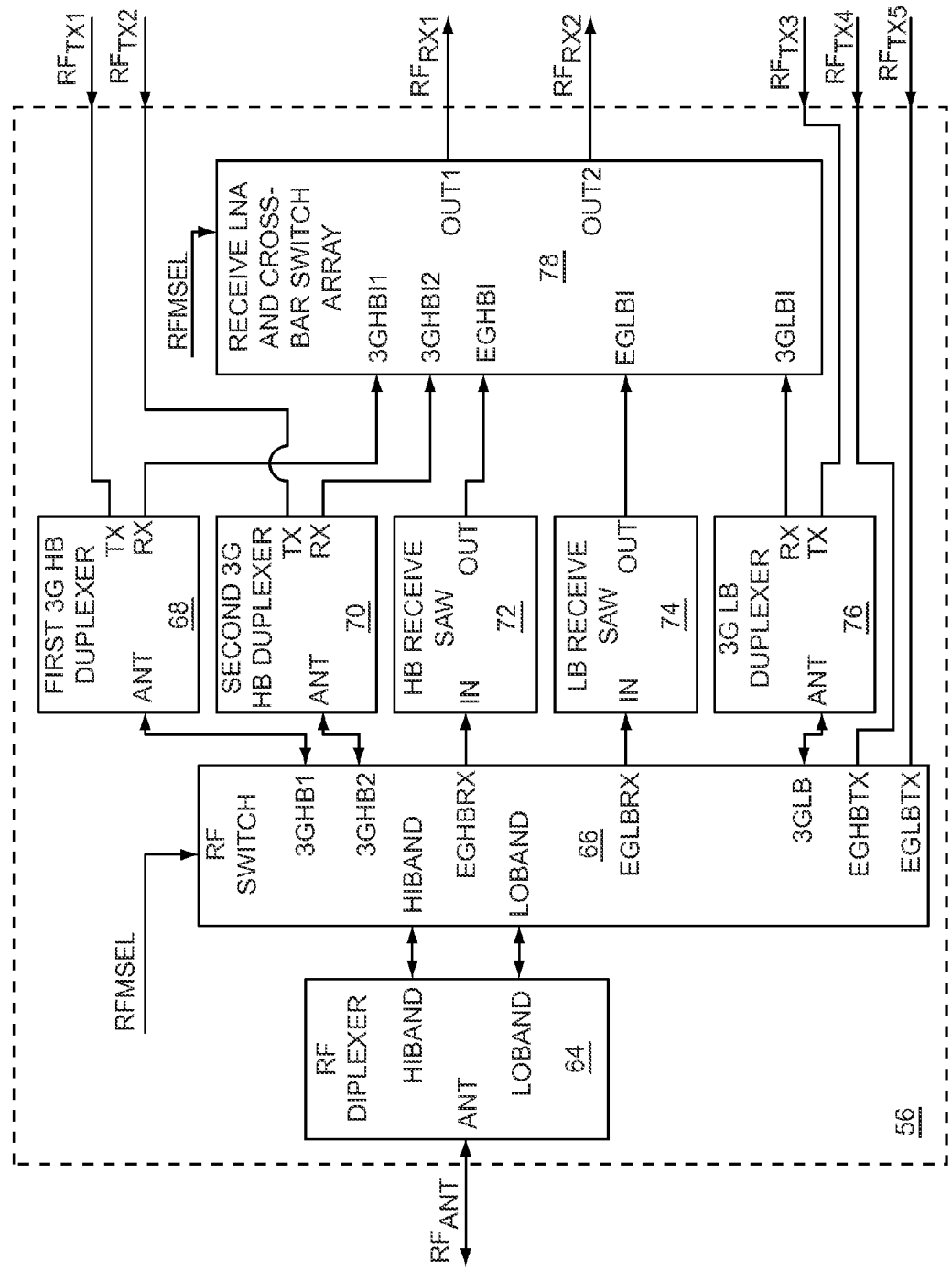
FIG. 13 shows details of RF front-end circuitry illustrated in FIG. 10 according to one embodiment of the present invention.

FIG. 13 shows details of the RF front-end circuitry 56 illustrated in FIG. 10 according to one embodiment of the present invention. The RF front-end circuitry 56 includes an RF diplexer 64, an RF switch 66, a first 3G highband duplexer 68, a second 3G highband duplexer 70, a highband receive surface acoustic wave (SAW) filter 72, a lowband receive SAW filter 74, a 3G lowband duplexer 76, and a receive low noise amplifier (LNA) and cross-bar switch array 78. The RF diplexer 64 includes an antenna terminal ANT coupled to the antenna 12 (not shown) for sending and receiving the antenna signals $RF_{ANT}$. Additionally, the RF diplexer 64 includes a highband terminal HIBAND, a lowband terminal LOBAND, a bidirectional highpass filter (not shown) coupled between the antenna terminal ANT and the highband terminal HIBAND, and a bidirectional lowpass filter (not shown) coupled between the antenna terminal ANT and the lowband terminal LOBAND. The bidirectional highpass filter allows only highband signals to pass between the antenna terminal ANT and the highband terminal HIBAND, and the bidirectional lowpass filter allows only lowband signals to pass between the antenna terminal ANT and the lowband terminal LOBAND. The RF diplexer 64 may support simultaneous transmission of highband signals, reception of highband signals, transmission of lowband signals, reception of lowband signals, or any combination thereof.

The RF switch 66 includes a highband terminal HIBAND, a lowband terminal LOBAND, a first 3G highband terminal 3GHB1, a second 3G highband terminal 3GHB2, an EDGE highband receive terminal EGHBRX, an EDGE lowband receive terminal EGLBRX, a 3G lowband terminal 3GLB, an EDGE highband transmit terminal EGHBTX, and an EDGE lowband transmit terminal EGLBTX. The highband terminal HIBAND of the RF switch 66 is coupled to the highband terminal HIBAND of the RF diplexer 64, and the lowband terminal LOBAND of the RF switch 66 is coupled to the lowband terminal LOBAND of the RF diplexer 64. The RF switch 66 receives the RF mode select signal RFMSEL and configures internal switching elements based on the RF mode select signal RFMSEL.

When the wireless communications terminal 10 is transmitting and receiving first highband 3G signals, the RF switch 66 is configured to couple the first 3G highband terminal 3GHB1 to the highband terminal HIBAND. When the wireless communications terminal 10 is transmitting and receiving second highband 3G signals, the RF switch 66 is configured to couple the second 3G highband terminal 3GHB2 to the highband terminal HIBAND. When the wireless communications terminal 10 is transmitting and receiving lowband 3G signals, the RF switch 66 is configured to couple the 3G lowband terminal 3GLB to the lowband terminal LOBAND. When the wireless communications terminal 10 is receiving highband EDGE Evolution signals, the RF switch 66 is configured to couple the EDGE highband receive terminal EGHBRX to the highband terminal HIBAND.

When the wireless communications terminal 10 is transmitting highband EDGE Evolution signals, the RF switch 66 is configured to couple the EDGE highband transmit terminal EGHBTX to the highband terminal HIBAND. The EDGE highband transmit terminal EGHBTX receives the fourth RF transmit signal $RF_{TX4}$. When the wireless communications terminal 10 is receiving lowband EDGE Evolution signals, the RF switch 66 is configured to couple the EDGE lowband receive terminal EGLBRX to the lowband terminal LOBAND. When the wireless communications terminal 10 is transmitting lowband EDGE Evolution signals, the RF switch 66 is configured to couple the EDGE lowband transmit terminal EGLBTX to the lowband terminal LOBAND. The EDGE lowband transmit terminal EGLBTX receives the fifth RF transmit signal $RF_{TX5}$.

The first 3G highband duplexer 68 includes an antenna terminal ANT, a transmit terminal TX, a receive terminal RX, a receive bandpass filter (not shown) coupled between the antenna terminal ANT and the receive terminal RX, and a transmit bandpass filter (not shown) coupled between the antenna terminal ANT and the transmit terminal TX. The antenna terminal ANT is coupled to the first 3G highband terminal 3GHB1 of the RF switch 66, the transmit terminal TX receives the first RF transmit signal $RF_{TX1}$, and the receive terminal RX is coupled to a first 3G highband input 3GHBI1 to the receive LNA and cross-bar switch array 78.

The first 3G highband duplexer 68 may allow simultaneous transmission and reception of first highband 3G signals. Typically, a passband of the receive bandpass filter does not overlap a passband of the transmit bandpass filter. The receive bandpass filter allows only signals within its passband to pass from the antenna terminal ANT to the receive terminal RX, and the transmit bandpass filter allows only signals within its passband to pass from the transmit terminal TX to the antenna terminal ANT.

The second 3G highband duplexer 70 includes an antenna terminal ANT, a transmit terminal TX, a receive terminal RX, a receive bandpass filter (not shown) coupled between the antenna terminal ANT and the receive terminal RX, and a transmit bandpass filter (not shown) coupled between the antenna terminal ANT and the transmit terminal TX. The antenna terminal ANT is coupled to the second 3G highband terminal 3GHB2 of the RF switch 66, the transmit terminal TX receives the second RF transmit signal $RF_{TX2}$, and the receive terminal RX is coupled to a second 3G highband input 3GHBI2 to the receive LNA and cross-bar switch array 78.

The second 3G highband duplexer 70 may allow simultaneous transmission and reception of second highband 3G signals. Typically, a passband of the receive bandpass filter does not overlap a passband of the transmit bandpass filter. The receive bandpass filter allows only signals within its passband to pass from the antenna terminal ANT to the receive terminal RX, and the transmit bandpass filter allows only signals within its passband to pass from the transmit terminal TX to the antenna terminal ANT.

The 3G lowband duplexer 76 includes an antenna terminal ANT, a transmit terminal TX, a receive terminal RX, a receive bandpass filter (not shown) coupled between the antenna terminal ANT and the receive terminal RX, and a transmit bandpass filter (not shown) coupled between the antenna terminal ANT and the transmit terminal TX. The antenna terminal ANT is coupled to the 3G lowband terminal 3GLB of the RF switch 66, the transmit terminal TX receives the third RF transmit signal $RF_{TX3}$, and the receive terminal RX is coupled to a 3G lowband input 3GLBI to the receive LNA and cross-bar switch array 78.

The 3G lowband duplexer 76 may allow simultaneous transmission and reception of lowband 3G signals. Typically, a passband of the receive bandpass filter does not overlap a passband of the transmit bandpass filter. The receive bandpass filter allows only signals within its passband to pass from the antenna terminal ANT to the receive terminal RX, and the transmit bandpass filter allows only signals within its passband to pass from the transmit terminal TX to the antenna terminal ANT.

The highband receive SAW filter 72 includes an input terminal IN, an output terminal OUT, and a receive bandpass filter (not shown) coupled between the input terminal IN and the output terminal OUT. The input terminal IN is coupled to the EDGE highband receive terminal EGHBRX of the RF switch 66, and the output terminal OUT is coupled to an EDGE highband input EGHBI to the receive LNA and cross-bar switch array 78. The receive bandpass filter allows only signals within a passband to pass from the input terminal IN to the output terminal OUT.

The lowband receive SAW filter 74 includes an input terminal IN, an output terminal OUT, and a receive bandpass filter (not shown) coupled between the input terminal IN and the output terminal OUT. The input terminal IN is coupled to the EDGE lowband receive terminal EGLBRX of the RF switch 66, and the output terminal OUT is coupled to an EDGE lowband input EGLBI to the receive LNA and cross-bar switch array 78. The receive bandpass filter allows only signals within a passband to pass from the input terminal IN to the output terminal OUT.

The receive LNA and cross-bar switch array 78 includes the first 3G highband input 3GHBI1, the second 3G highband input 3GHBI2, the 3G lowband input 3GLBI, the EDGE highband input EGHBI, the EDGE lowband input EGLBI, a first output OUT1, which provides the first RF receive signal $RF_{RX1}$, and a second output OUT2, which provides the second RF receive signal $RF_{RX2}$. The receive LNA and cross-bar switch array 78 includes five LNAs (not shown) and a cross-bar switch array (not shown). Each of the first 3G highband input 3GHBI1, the second 3G highband input 3GHBI2, the 3G lowband input 3GLBI, the EDGE highband input EGHBI, and the EDGE lowband input EGLBI feeds an input to a corresponding LNA. Outputs from the LNAs feed the cross-bar switch array, which is configured to couple one or more outputs from the LNAs to the first output OUT1, the second output OUT2, or both, based on the RF mode select signal RFMSEL.

In an exemplary embodiment of the present invention, when the wireless communications terminal 10 is transmitting and receiving first highband 3G signals, the output of the LNA associated with the first 3G highband input 3GHBI1 is coupled to the first output OUT1. When the wireless communications terminal 10 is transmitting and receiving second highband 3G signals, the output of the LNA associated with the second 3G highband input 3GHBI2 is coupled to the first output OUT1. When the wireless communications terminal 10 is transmitting and receiving lowband 3G signals, the output of the LNA associated with the 3G lowband input 3GLBI is coupled to the first output OUT1, when the wireless communications terminal 10 is receiving highband EDGE Evolution signals, the output of the LNA associated with the EDGE highband input EGHBI is coupled to both the first output OUT1 and the second output OUT2. When the wireless communications terminal 10 is receiving lowband EDGE Evolution signals, the output of the LNA associated with the EDGE lowband input EGLBI is coupled to both the first output OUT1 and the second output OUT2. When the wireless communications terminal 10 is simultaneously receiving highband EDGE Evolution signals and lowband EDGE Evolution signals, the output of the LNA associated with the EDGE highband input EGHBI is coupled to the first output OUT1 and the output of the LNA associated with the EDGE lowband input EGLBI is coupled to the second output OUT2.

When the output of the LNA associated with the EDGE highband input EGHBI is driving both the first output OUT1 and the second output OUT2, the drive strength of the output may be increased to compensate for driving two outputs instead of one output. Similarly, when the output of the LNA associated with the EDGE lowband input EGLBI is driving both the first output OUT1 and the second output OUT2, the drive strength of the output may be increased to compensate for driving two outputs instead of one output.

In alternate embodiments of the present invention, the RF diplexer 64 may be omitted, such that the wireless communications terminal 10 supports either highband signals or lowband signals. The RF switch 66 may support any number of 3G highband signals, 3G lowband signals, EDGE Evolution transmit signals, EDGE Evolution highband receive signals, EDGE Evolution lowband transmit signals, EDGE Evolution lowband receive signals, or any combination thereof. Any number of 3G duplexers 68, 70, 76 may be added or omitted, any number of receive SAW filters 72, 74 may be added or omitted, or any combination thereof. The receive LNA and cross-bar switch array 78 may support any number of 3G highband signals, 3G lowband signals, EDGE Evolution lowband receive signals, EDGE Evolution highband receive signals, or any combination thereof.

Figure 14:
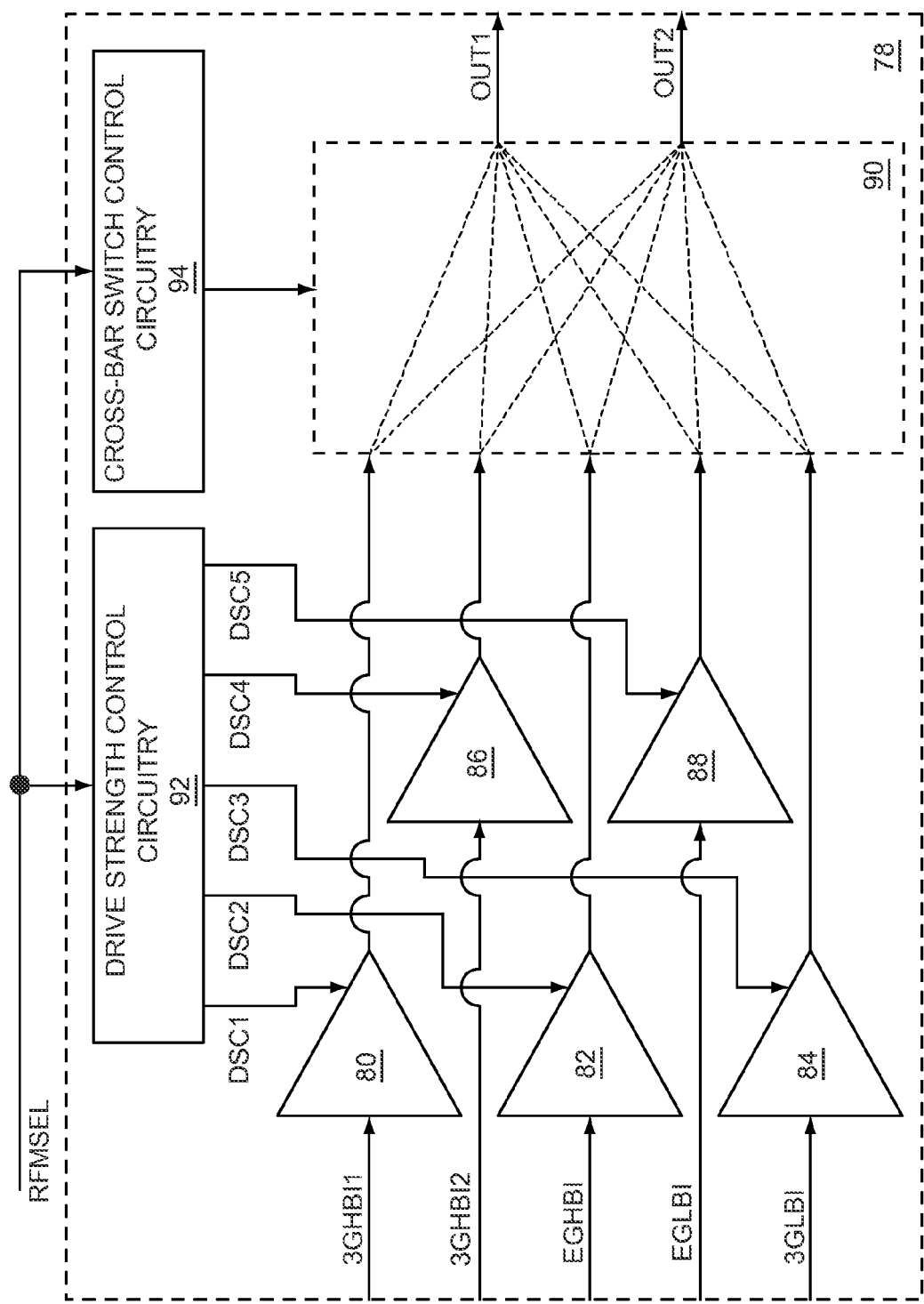
FIG. 14 shows details of a receive low noise amplifier (LNA) and cross-bar switch array illustrated in FIG. 13 according to one embodiment of the present invention.

FIG. 14 shows details of the receive LNA and cross-bar switch array 78 illustrated in FIG. 13 according to one embodiment of the present invention. The receive LNA and cross-bar switch array 78 includes a first LNA 80, a second LNA 82, a third LNA 84, a fourth LNA 86, a fifth LNA 88, a cross-bar switch 90, drive strength control circuitry 92, and cross-bar switch control circuitry 94. The first 3G highband input 3GHBI1 is coupled to an input to the first LNA 80, the EDGE highband input EGHBI is coupled to an input to the second LNA 82, the 3G lowband input 3GLBI is coupled to an input to the third LNA 84, the second 3G highband input 3GHBI2 is coupled to an input to the fourth LNA 86, and the EDGE lowband input EGLBI is coupled to an input to the fifth LNA 88. Each of the first, second, third, fourth, and fifth LNAs 80, 82, 84, 86, 88 has an output coupled to the cross-bar switch 90, and each of the first, second, third, fourth, and fifth LNAs 80, 82, 84, 86, 88 amplifies an RF signal at its input to provide an amplified signal at its corresponding output.

The RF mode select signal RFMSEL is fed to the drive strength control circuitry 92 and the cross-bar switch control circuitry 94. The drive strength control circuitry 92 provides a first drive strength control signal DSC1, a second drive strength control signal DSC2, a third drive strength control signal DSC3, a fourth drive strength control signal DSC4, and a fifth drive strength control signal DSC5 to the first, second, third, fourth, and fifth LNAs 80, 82, 84, 86, 88, respectively, based on the RF mode select signal RFMSEL. The cross-bar switch 90 has a first node (not shown) coupled to the first output OUT1 and a second node (not shown) coupled to the second output OUT2. The cross-bar switch control circuitry 94 selects a configuration of the cross-bar switch 90 based on the RF mode select signal RFMSEL. The cross-bar switch 90 may be configured such that the first output OUT1 may be coupled to the output of one of the first, second, third, fourth, and fifth LNAs 80, 82, 84, 86, 88 and the second output OUT2 may be coupled to the output of one of the first, second, third, fourth, and fifth LNAs 80, 82, 84, 86, 88.

When the output of one of the first, second, third, fourth, and fifth LNAs 80, 82, 84, 86, 88 is coupled to both the first and second outputs OUT1, OUT2, the drive strength of the LNA may be increased to compensate for driving two loads instead of a single load. Any outputs of the first, second, third, fourth, and fifth LNAs 80, 82, 84, 86, 88 that are coupled to only one of the first and second outputs OUT1, OUT2, or not coupled to an output, may be configured to provide a normal drive strength.

In an exemplary embodiment of the present invention, when the wireless communications terminal 10 is transmitting and receiving first highband 3G signals, the cross-bar switch 90 may be configured such that the output of the first LNA 80, which is associated with the first 3G highband input 3GHBI1, is coupled to the first output OUT1, when the wireless communications terminal 10 is transmitting and receiving second highband 3G signals, the cross-bar switch 90 may be configured such that the output of the fourth LNA 86, which is associated with the second 3G highband input 3GHBI2, is coupled to the first output OUT1, and when the wireless communications terminal 10 is transmitting and receiving lowband 3G signals, the cross-bar switch 90 may be configured such that the output of the third LNA 84, which is associated with the 3G lowband input 3GLBI, is coupled to the first output OUT1. When the output of the first, third, or fourth LNA 80, 84, 86 is driving just the first output OUT1, the output of the respective LNA may be configured to provide normal drive strength.

When the wireless communications terminal 10 is receiving highband EDGE Evolution signals, the cross-bar switch 90 may be configured such that the output of the second LNA 82, which is associated with the EDGE highband input EGHBI, is coupled to both the first output OUT1 and the second output OUT2, and when the wireless communications terminal 10 is receiving lowband EDGE Evolution signals, the cross-bar switch 90 may be configured such that the output of the fifth LNA 88, which is associated with the EDGE lowband input EGLBI, is coupled to both the first output OUT1 and the second output OUT2. When the output of the second or fifth LNA 82, 88 is driving both the first output OUT1 and the second output OUT2, the drive strength of the output of the respective LNA may be increased to compensate for driving two outputs instead of one output.

Some of the circuitry previously described may use discrete circuitry, integrated circuitry, programmable circuitry, non-volatile circuitry, volatile circuitry, software executing instructions on computing hardware, firmware executing instructions on computing hardware, the like, or any combination thereof. The computing hardware may include mainframes, micro-processors, micro-controllers, digital signal processors (DSPs), the like, or any combination thereof.

Those skilled in the art will recognize improvements and modifications to the preferred embodiments of the present invention. All such improvements and modifications are considered within the scope of the concepts disclosed herein and the claims that follow.

What is claimed is:

1. A dual radio frequency (RF) receiver circuit comprising:
   local oscillator circuitry adapted to provide a first local oscillator (LO) signal having a first LO frequency and a second LO signal having a second LO frequency;
   a first RF mixer coupled to the local oscillator circuitry and adapted to:
     receive a first RF input signal having a first wanted frequency;
     receive the first LO signal, such that the first wanted frequency is greater than the first LO frequency; and
     mix the first RF input signal and the first LO signal to provide a first intermediate frequency (IF) output signal; and
   a second RF mixer coupled to the local oscillator circuitry and adapted to:
     receive a second RF input signal having a second wanted frequency;
     receive the second LO signal, such that the second wanted frequency is less than the second LO frequency; and
     mix the second RF input signal and the second LO signal to provide a second IF output signal; and
   the RF receiver circuit adapted to process substantially simultaneously two different data streams that arrive as the first RF input signal and the second RF input signal respectively; and
further comprising control circuitry coupled to the local oscillator circuitry and adapted to select one of a first operating mode, a second operating mode, a third operating mode, and a fourth operating mode, such that:
   during the first operating mode, the first RF mixer is further adapted to:
     receive the first RF input signal having the first wanted frequency, such that the first wanted frequency is greater than the first LO frequency; and
     mix the first RF input signal and the first LO signal to provide the first IF output signal;
   during the second operating mode, the first RF mixer is further adapted to:
     receive a third RF input signal having a third wanted frequency, such that the third wanted frequency is less than the first LO frequency; and
     mix the third RF input signal and the first LO signal to provide the first IF output signal;
   during the third operating mode, the first RF mixer is further adapted to:
     receive the first RF input signal having the first wanted frequency, such that the first wanted frequency is greater than the first LO frequency; and
     mix the first RF input signal and the first LO signal to provide the first IF output signal;
   during the fourth operating mode, the first RF mixer is further adapted to:
     receive the third RF input signal having the third wanted frequency, such that the third wanted frequency is less than the first LO frequency; and
     mix the third RF input signal and the first LO signal to provide the first IF output signal;
   during the first operating mode, the second RF mixer is further adapted to:
     receive the second RF input signal having the second wanted frequency, such that the second wanted frequency is less than the second LO frequency; and
     mix the second RF input signal and the second LO signal to provide the second IF output signal;
   during the second operating mode, the second RF mixer is further adapted to:
     receive the second RF input signal having the second wanted frequency, such that the second wanted frequency is less than the second LO frequency; and
     mix the second RF input signal and the second LO signal to provide the second IF output signal;
   during the third operating mode, the second RF mixer is further adapted to:
     receive a fourth RF input signal having a fourth wanted frequency, such that the fourth wanted frequency is greater than the second LO frequency; and
     mix the fourth RF input signal and the second LO signal to provide the second IF output signal; and
   during the fourth operating mode, the second RF mixer is further adapted to:
     receive the fourth RF input signal having the fourth wanted frequency, such that the fourth wanted frequency is greater than the second LO frequency; and
     mix the fourth RF input signal and the second LO signal to provide the second IF output signal.

2. The dual RF receiver circuit of claim 1 wherein the first LO signal and the second LO signal are based on a common LO signal.

3. The dual RF receiver circuit of claim 2 wherein the first RF mixer and the second RF mixer are adapted to receive a plurality of RF signals using a plurality of RF channels, wherein the plurality of RF channels has a channel separation based on an integer multiple of two times a difference between the first wanted frequency and the first LO frequency.

4. The dual RF receiver circuit of claim 1 wherein the selection of the one of the first operating mode, the second operating mode, the third operating mode, and the fourth operating mode is based on maximizing a difference between the first LO frequency and the second LO frequency.

5. The dual RF receiver circuit of claim 1 wherein the selection of the one of the first operating mode, the second operating mode, the third operating mode, and the fourth operating mode is based on providing an adequate difference between the first LO frequency and the second LO frequency.

6. The dual RF receiver circuit of claim 1 wherein the selection of the one of the first operating mode, the second operating mode, the third operating mode, and the fourth operating mode is based on providing an adequate difference between a frequency of an interfering RF signal and an image frequency of at least one of the first wanted frequency and the second wanted frequency.

7. The dual RF receiver circuit of claim 1 wherein the selection of the one of the first operating mode, the second operating mode, the third operating mode, and the fourth operating mode is based on providing an adequate difference between a frequency of a spurious RF signal and at least one of the first LO frequency and the second LO frequency.

8. The dual RF receiver circuit of claim 1 wherein the first RF input signal is a differential signal and the second RF input signal is a differential signal.

9. The dual RF receiver circuit of claim 1 wherein the first RF input signal is a single-ended signal and the second RF input signal is a single-ended signal.

10. The dual RF receiver circuit of claim 1 wherein the local oscillator circuitry comprises:
a first frequency synthesizer adapted to provide the first LO signal; and
a second frequency synthesizer adapted to provide a second frequency synthesizer output signal.

11. The dual RF receiver circuit of claim 10 wherein:
the first frequency synthesizer comprises:
a first voltage-controlled oscillator (VCO) adapted to provide a first VCO output signal; and
a first divider adapted to receive and divide the first VCO output signal to provide the first LO signal; and
the second frequency synthesizer comprises:
a second VCO adapted to provide a second VCO output signal; and
a second divider adapted to receive and divide the second VCO output signal to provide the second frequency synthesizer output signal, wherein the second frequency synthesizer output signal is the second LO signal.

12. The dual RF receiver circuit of claim 11 wherein a frequency of the first VCO output signal is about two times a frequency of the first LO signal, and a frequency of the second VCO output signal is about two times a frequency of the second LO signal.

13. The dual RF receiver circuit of claim 11 wherein a frequency of the first VCO output signal is about four times a frequency of the first LO signal, and a frequency of the second VCO output signal is about four times a frequency of the second LO signal.

14. The dual RF receiver circuit of claim 10 further comprising:
control circuitry coupled to the local oscillator circuitry and adapted to select one of a first RF operating mode and a second RF operating mode; and
RF receiver front-end circuitry adapted to:
during the first RF operating mode and when an accompanying RF transmitter is not transmitting RF signals:
provide the first RF input signal to the first RF mixer; and
provide the second RF input signal to the second RF mixer, such that the second LO signal is based on the second frequency synthesizer output signal; and
during the second RF operating mode, provide a third RF input signal to the first RF mixer,
wherein during the second RF operating mode and when an accompanying RF transmitter is transmitting RF signals, the accompanying RF transmitter is adapted to receive the second frequency synthesizer output signal.

15. The dual RF receiver circuit of claim 14 wherein during the second RF operating mode, the first RF mixer is not adapted to receive the first RF input signal and the second RF mixer is not adapted to receive the second RF input signal.

16. The dual RF receiver circuit of claim 14 wherein during the first RF operating mode, the first and second RF input signals are Enhanced Data Rates for Global Evolution (EDGE) Evolution signals, and during the second RF operating mode, the third RF input signal is a third generation (3G) signal.

17. The dual RF receiver circuit of claim 1 further comprising:
control circuitry coupled to the local oscillator circuitry and adapted to select one of a first RF operating mode and a second RF operating mode;
RF receiver front-end circuitry adapted to:
during the first RF operating mode:
provide the first RF input signal to the first RF mixer; and
provide the second RF input signal to the second RF mixer; and
during the second RF operating mode, provide a third RF input signal to the first RF mixer; and
an RF diversity receiver adapted to, during the second RF operating mode, provide a diversity RF receive signal to the second RF mixer.

18. The dual RF receiver circuit of claim 17 wherein during the second RF operating mode, the first RF mixer is not adapted to receive the first RF input signal and the second RF mixer is not adapted to receive the second RF input signal.

19. The dual RF receiver circuit of claim 17 wherein during the first RF operating mode, the first and second RF input signals are Enhanced Data Rates for Global Evolution (EDGE) Evolution signals, and during the second RF operating mode, the third RF input signal and the diversity RF receive signal are third generation (3G) signals.

20. The dual RF receiver circuit of claim 17 wherein:
the RF receiver front-end circuitry comprises first switch circuitry adapted to:
during the first RF operating mode, couple the RF receiver front-end circuitry to the second RF mixer; and
during the second RF operating mode, isolate the RF receiver front-end circuitry from the second RF mixer; and
the RF diversity receiver comprises second switch circuitry adapted to:
during the second RF operating mode, couple the RF diversity receiver to the second RF mixer; and
during the first RF operating mode, isolate the RF diversity receiver from the second RF mixer.

21. The dual RF receiver circuit of claim 1 further comprising a plurality of receive nodes and switching circuitry coupled to the plurality of receive nodes and adapted to provide the first RF input signal based on one of the plurality of receive nodes and to provide the second RF input signal based on one of the plurality of receive nodes.

22. The dual RF receiver circuit of claim 21 further comprising a plurality of low noise amplifiers (LNAs) wherein each of the plurality of LNAs comprises an output coupled to a corresponding each of the plurality of receive nodes.

23. The dual RF receiver circuit of claim 22 wherein the each of the plurality of LNAs is adapted to:
when the switching circuitry is configured to provide one of the first RF input signal, the second RF input signal, and no signal, based on the each of the plurality of LNAs, the each of the plurality of LNAs provides normal drive strength; and
when the switching circuitry is configured to provide both the first and second RF input signals based on the each of the plurality of LNAs, the each of the plurality of LNAs provides increased drive strength.

24. The dual RF receiver circuit of claim 23 further comprising an RF switch and a plurality of RF filters, such that each of the plurality of RF filters is coupled between an input to a corresponding each of the plurality of LNAs and the RF switch.

25. The dual RF receiver circuit of claim 24 further comprising an antenna and an RF diplexer coupled between the antenna and the RF switch.

26. A method comprising:
receiving a first RF input signal having a first wanted frequency;
providing a first local oscillator (LO) signal having a first LO frequency, such that the first wanted frequency is greater than the first LO frequency;
receiving the first LO signal;
mixing the first RF input signal and the first LO signal to provide a first intermediate frequency (IF) output signal;
substantially simultaneously with receipt of the first RF input signal, receiving a second RF input signal having a second wanted frequency;
providing a second LO signal having a second LO frequency, such that the second wanted frequency is less than the second LO frequency;
receiving the second LO signal; and
mixing the second RF input signal and the second LO signal to provide a second IF output signal;
providing control circuitry coupled to the first LO;
selecting one of a first operating mode, a second operating mode, a third operating mode, and a fourth operating mode, such that:
during the first operating mode:
receiving the first RF input signal having the first wanted frequency, such that the first wanted frequency is greater than the first LO frequency; and
mixing the first RF input signal and the first LO signal to provide the first IF output signal;
during the second operating mode:
receiving a third RF input signal having a third wanted frequency, such that the third wanted frequency is less than the first LO frequency; and
mixing the third RF input signal and the first LO signal to provide the first IF output signal;
during the third operating mode:
receiving the first RF input signal having the first wanted frequency, such that the first wanted frequency is greater than the first LO frequency; and
mixing the first RF input signal and the first LO signal to provide the first IF output signal;
during the fourth operating mode:
receiving the third RF input signal having the third wanted frequency, such that the third wanted frequency is less than the first LO frequency; and
mixing the third RF input signal and the first LO signal to provide the first IF output signal;
during the first operating mode:
receiving the second RF input signal having the second wanted frequency, such that the second wanted frequency is less than the second LO frequency; and
mixing the second RF input signal and the second LO signal to provide the second IF output signal;
during the second operating mode:
receiving the second RF input signal having the second wanted frequency, such that the second wanted frequency is less than the second LO frequency; and
mixing the second RF input signal and the second LO signal to provide the second IF output signal;
during the third operating mode:
receiving a fourth RF input signal having a fourth wanted frequency, such that the fourth wanted frequency is greater than the second LO frequency; and
mixing the fourth RF input signal and the second LO signal to provide the second IF output signal; and during the fourth operating mode:
receiving the fourth RF input signal having the fourth wanted frequency, such that the fourth wanted frequency is greater than the second LO frequency; and
mixing the fourth RF input signal and the second LO signal to provide the second IF output signal.

27. A dual radio frequency (RF) receiver circuit comprising:
local oscillator circuitry adapted to provide a first local oscillator (LO) signal having a first LO frequency and a second LO signal having a second LO frequency;
a first RF mixer coupled to the local oscillator circuitry and adapted to:
receive a first RF input signal having a first wanted frequency;
receive the first LO signal, such that the first wanted frequency is greater than the first LO frequency; and
mix the first RF input signal and the first LO signal to provide a first intermediate frequency (IF) output signal; and
a second RF mixer coupled to the local oscillator circuitry and adapted to:
receive a second RF input signal having a second wanted frequency;
receive the second LO signal, such that the second wanted frequency is less than the second LO frequency; and
mix the second RF input signal and the second LO signal to provide a second IF output signal; and
the RF receiver circuit adapted to process substantially simultaneously two different data streams that arrive as the first RF input signal and the second RF input signal respectively; and
further comprising control circuitry coupled to the local oscillator circuitry and adapted to select one of a first operating mode, a second operating mode, a third operating mode, and a fourth operating mode, such that:
during the first operating mode, the first RF mixer is further adapted to:
receive the first RF input signal having the first wanted frequency, such that the first wanted frequency is greater than the first LO frequency; and
mix the first RF input signal and the first LO signal to provide the first IF output signal.

28. A dual radio frequency (RF) receiver circuit comprising:
local oscillator circuitry adapted to provide a first local oscillator (LO) signal having a first LO frequency and a second LO signal having a second LO frequency;
a first RF mixer coupled to the local oscillator circuitry and adapted to:
receive a first RF input signal having a first wanted frequency;
receive the first LO signal, such that the first wanted frequency is greater than the first LO frequency; and
mix the first RF input signal and the first LO signal to provide a first intermediate frequency (IF) output signal; and
a second RF mixer coupled to the local oscillator circuitry and adapted to:
receive a second RF input signal having a second wanted frequency;
receive the second LO signal, such that the second wanted frequency is less than the second LO frequency; and
mix the second RF input signal and the second LO signal to provide a second IF output signal; and the RF receiver circuit adapted to process substantially simultaneously two different data streams that arrive as the first RF input signal and the second RF input signal respectively; and further comprising control circuitry coupled to the local oscillator circuitry and adapted to select one of a first operating mode, a second operating mode, a third operating mode, and a fourth operating mode, such that:

during the first operating mode, the first RF mixer is further adapted to:

receive the first RF input signal having the first wanted frequency, such that the first wanted frequency is greater than the first LO frequency; and mix the first RF input signal and the first LO signal to provide the first IF output signal; and during the second operating mode, the first RF mixer is further adapted to:

receive a third RF input signal having a third wanted frequency, such that the third wanted frequency is less than the first LO frequency; and mix the third RF input signal and the first LO signal to provide the first IF output signal.

* * * * *